US012596366B2

(12) United States Patent (10) Patent No.: US 12,596,366 B2
Nishida et al. (45) Date of Patent: Apr. 7, 2026

(54) WORK AREA MANAGEMENT METHOD, WORK AREA MANAGEMENT SYSTEM, AND WORK AREA MANAGEMENT PROGRAM

(71) Applicant: Yanmar Holdings Co., Ltd., Osaka (JP)

(72) Inventors: Yusuke Nishida, Okayama (JP); Yasuto Nishii, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 395 days.

(21) Appl. No.: 18/142,040

(22) Filed: May 2, 2023

(65) Prior Publication Data

US 2023/0359200 A1     Nov. 9, 2023

(30) Foreign Application Priority Data

May 9, 2022     (JP) ................................. 2022-076819
Feb. 7, 2023     (JP) ................................. 2023-016622

(51) Int. Cl.
G05D 1/00          (2024.01)
A01D 41/127        (2006.01)
(52) U.S. Cl.
CPC ....... G05D 1/0044 (2013.01); A01D 41/1278 (2013.01); G05D 1/0219 (2013.01)
(58) Field of Classification Search
CPC ........ G05D 1/692; G05D 1/6985; G05D 1/43; G05D 1/648; G05D 1/0044; G05D 1/0219; G05D 1/0274; G05D 2105/15;

G05D 2107/21; G05D 2109/10; A01D 41/1278; G01C 21/20; A01B 69/008; A01B 69/007; A01B 69/003
See application file for complete search history.

(56) References Cited

U.S. PATENT DOCUMENTS

| | | |
|---|---|---|
| 2017/0339820 A1 | 11/2017 | Foster et al. |
| 2018/0210092 A1* | 7/2018 | Shinkai ................... G01S 19/04 |
| 2019/0049984 A1 | 2/2019 | Wong et al. |
| 2019/0146513 A1* | 5/2019 | Tomita ................. B60W 30/10 |
| | | 701/50 |
| 2020/0064144 A1* | 2/2020 | Tomita ..................... B62D 6/00 |
| 2020/0064863 A1* | 2/2020 | Tomita ................... A01B 69/00 |
| 2020/0319649 A1 | 10/2020 | Unesaki et al. |

* cited by examiner

*Primary Examiner* — Russell Frejd
(74) *Attorney, Agent, or Firm* — Chris Mizumoto

(57)          ABSTRACT

A work area management method includes storing first area information that represents a first work area that determines a first work route along which a first work device moves to perform a first work in a field, and that is determined on the basis of a positioning position of the first work device. The work area management method also includes outputting the first area information as information that represents an area for determining a second work route along which a second work device different from the first work device moves to perform a second work in the field. The outputting the first area information may include outputting warning information representing that the first area information is unsuitable for determining the second work route when the first area information does not satisfy a predetermined condition.

15 Claims, 15 Drawing Sheets

410

| AREA POSITION | AREA SHAPE | MODEL | REGISTRATION DATE | FINAL USE DATE |
|---|---|---|---|---|
| A | SHAPE A | TRACTOR | 2015. 10. 01 | 2015. 10. 10 |
| B | SHAPE B | COMBINE HARVESTER | 2015. 09. 01 | 2021. 09. 01 |
| C | SHAPE C | RICE TRANSPLANTER | 2021. 04. 20 | 2021. 04. 20 |
| ⋮ | ⋮ | ⋮ | ⋮ | ⋮ |

WORK AREA MANAGEMENT METHOD, WORK AREA MANAGEMENT SYSTEM, AND WORK AREA MANAGEMENT PROGRAM

CROSS-REFERENCE

This application claims foreign priority of JP2022-076819, filed May 9, 2022, and JP2023-016622, filed Feb. 7, 2023, the disclosures of which are hereby incorporated by reference in their entirety.

TECHNICAL FIELD

The present invention relates to a work area management method, a work area management system, and a work area management program.

BACKGROUND ART

In recent years, research has been conducted on work device that performs work in the field by moving autonomously.

Patent document 1 discloses a work device that identifies a work area to be worked on by traveling circumferentially around the work area as a preparatory work before the work by autonomous traveling.

PRIOR ART DOCUMENT

Patent Document

Patent Document 1: Japanese Patent Publication No. 6592367

SUMMARY OF INVENTION

Technical Problem

However, the technology described in Patent Document 1 requires that the work device performing work in the field travels circumferentially around the work area. Therefore, even in the same field, when a different work device is used, it is required to perform preparation work on the work device that performs work.

In view of the above circumstances, one of the objectives of this disclosure is to reduce workload related to preparatory work for work by autonomous traveling by sharing a work area among a plurality of work devices. Other objectives can be understood from the following descriptions and the description of embodiments.

Solution to Problem

A description will hereinafter be given of means for solving the problem with numbers and signs used in embodiments for carrying out the invention. These numbers and signs are added in parentheses as a reference to show an example of corresponding relations between the description of the scope according to claims and the embodiments for carrying out the invention. Therefore, the scope according to claims should not be construed as being limited to the descriptions with the parentheses.

A work area management method according to one embodiment to achieve the above-mentioned objective includes storing first area information that represents a first work area (640) that determines a first work route (650)

along which a first work device (100) moves to perform a first work in a field (500), and that is determined on the basis of a positioning position of the first work device (100). The work area management method also includes outputting the first area information as information that represents an area for determining a second work route (750) along which a second work device (300) different from the first work device (100) moves to perform a second work in the field (500).

A work area management system (1000) according to one embodiment to achieve the above-mentioned objective includes an area storage unit (260), and a use area selection unit (270). The area storage unit (260) stores first area information that represents a first work area (640) that determines a first work route (650) along which a first work device (100) moves to perform a first work in a field (500), and that is determined on the basis of a positioning position of the first work device (100). The use area selection unit (270) includes outputting the first area information as information that represents an area for determining a second work route (750) along which a second work device (300) different from the first work device (100) moves to perform a second work in the field (500).

A work area management program (420) that causes a computing device (220) to execute storing first area information that represents a first work area (640) that determines a first work route (650) along which a first work device (100) moves to perform a first work in a field (500), and that is determined on the basis of a positioning position of the first work device (100). The work area management program (420) also causes the computing device (220) to execute outputting the first area information as information that represents an area for determining a second work route (750) along which a second work device (300) different from the first work device (100) moves to perform a second work in the field (500).

Advantageous Effects of Invention

According to the above embodiments, workload related to preparatory work for work by autonomous traveling can be reduced.

DESCRIPTION OF EMBODIMENTS

Embodiment 1

Figure 1:
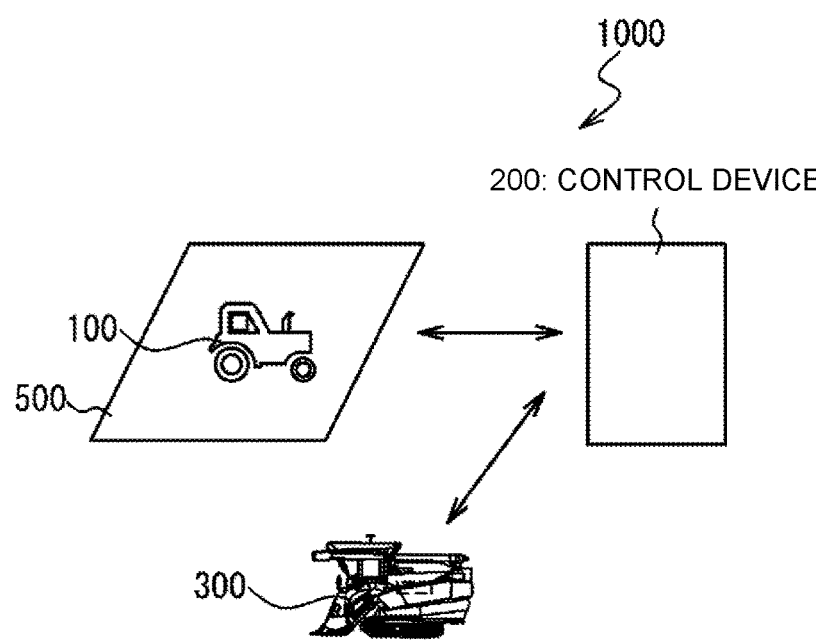
FIG. 1 is a schematic diagram of a work area management system in an embodiment.

A description will be made on a work area management system 1000 according to this embodiment of the present invention with reference to the drawings. As illustrated in FIG. 1, the work area management system 1000 includes a first work device 100, a control device 200, and a second work device 300. The first work device 100 and the second work device 300 can move and work autonomously in a field 500. The control device 200 is communicatively connected to the first work device 100 and the second work device 300, and determines work routes along which the first work device 100 and the second work device 300 move in the field 500.

Figure 2:
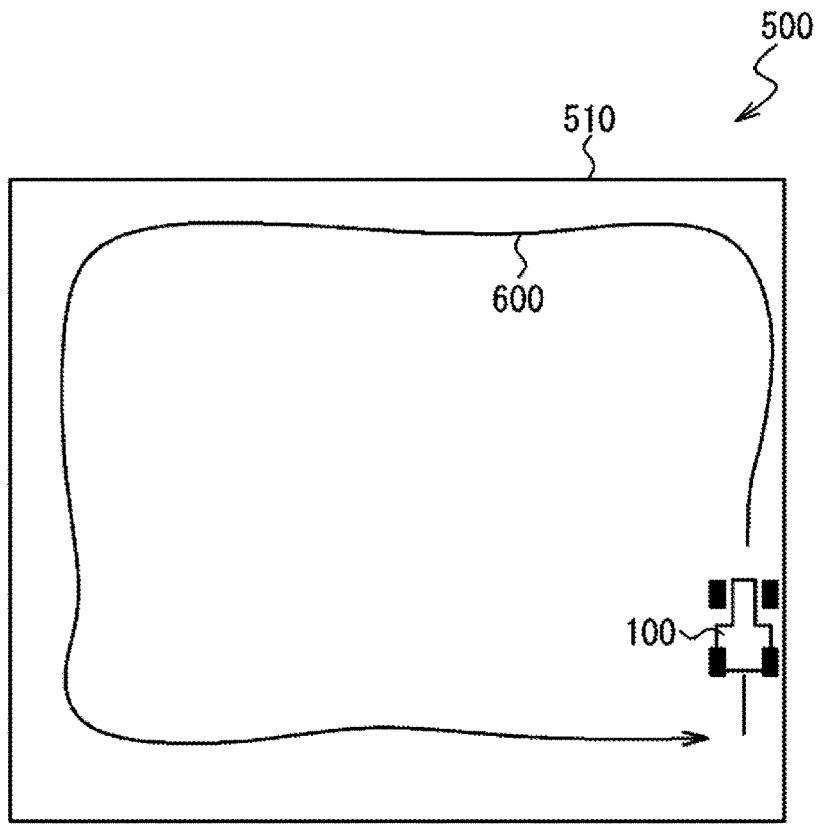
FIG. 2 is a diagram for explaining a registration route along which a first work device moves when registering a work area in the embodiment.

The first work device 100, for example, a tractor, which is steered by an operator, circulates along a contour 510 of the field 500 for one time, as illustrated in FIG. 2, to register a work area, which represents an area to be worked, in the control device 200. For example, the control device 200 registers, as a work area, an area surrounded by a registration route 600 that represents the route along which the first work device 100 circulated and moved, and determines a work route along which the first work device 100 moves in the registered work area. The first work device 100 moves in the work area, for example, in the field 500, along the determined work route to perform work.

Figure 3:
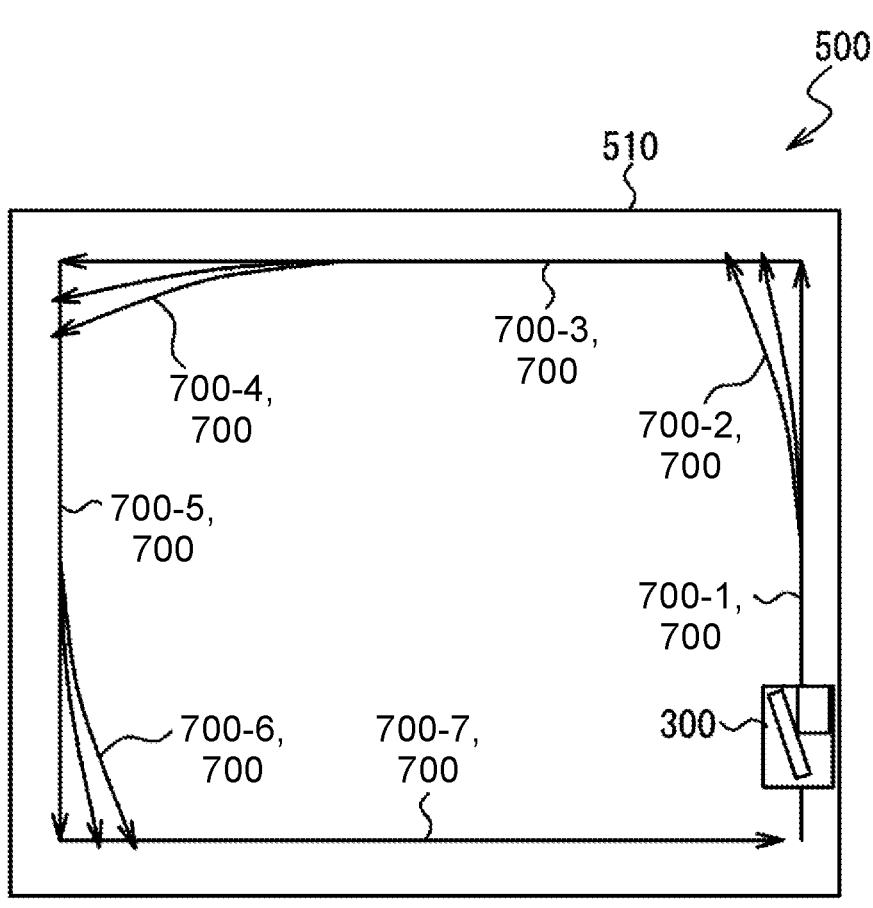
FIG. 3 is a diagram for explaining a registration route that a second work device moves when registering a work area in the embodiment.

The second work device 300, which is different from the first work device 100, for example, a combine harvester, also circulates along the contour 510 of the field 500 for one time, operated by an operator, as illustrated in FIG. 3, to register the work area representing the area to be worked in the control device 200. For example, the second work device 300 follows a first registration route 700-1 along the contour 510 to harvest crops grown in the field 500. When the second work device 300 reaches an edge of the field 500, the second work device 300 harvests the crops along a second registration route 700-2, which repeatedly moves forward and backward to shift inward in the field 500, and secures an area to change a traveling direction. The second work device 300 then changes the traveling direction and follows a third registration route 700-3 along the contour 510 to harvest the crops. Similarly, the second work device 300 follows a fourth registration route 700-4, which repeats forward and backward, a fifth registration route 700-5 along the contour 510, a sixth registration route 700-6, which repeats forward and backward, and a seventh registration route 700-7 along the contour 510 in turn, thus circulating the field 500 for one time.

The control device 200 registers a work area of the second work device 300 on the basis of the registration route 700 and determines a work route along which the second work device 300 moves in the registered work area. The second work device 300 moves in the work area, for example, in the field 500, along the determined work route to perform work.

Thus, the work area in the same field 500 is registered by both the first work device 100 and the second work device 300. Here, the control device 200 determines a work route of the second work device 300 in the work area registered by the first work device 100, thereby reducing the work area registration work by a user, for example, an operator. Furthermore, accuracy of the registered work area varies depending on a model of the work device. Therefore, when determining a work route, the control device 200 may inform the user of a warning depending on the accuracy of the registered work area.

(Configuration of Work Area Management System)

A description will be made on a configuration of the first work device 100 that is included in the work area management system 1000 illustrated in FIG. 1. The first work device 100 represents any device that performs work in the field 500 and includes a tractor that tows a work machine such as a rotary cultivator, a fertilizer, or the like to perform work. The first work device 100 may include a device that is integrally configured with a work machine, and examples of such a device include a rice transplanter, a combine harvester, and the like. The first work device 100 may also include a device that flies and performs work, for example, a drone that sprays pesticides.

Figure 4:
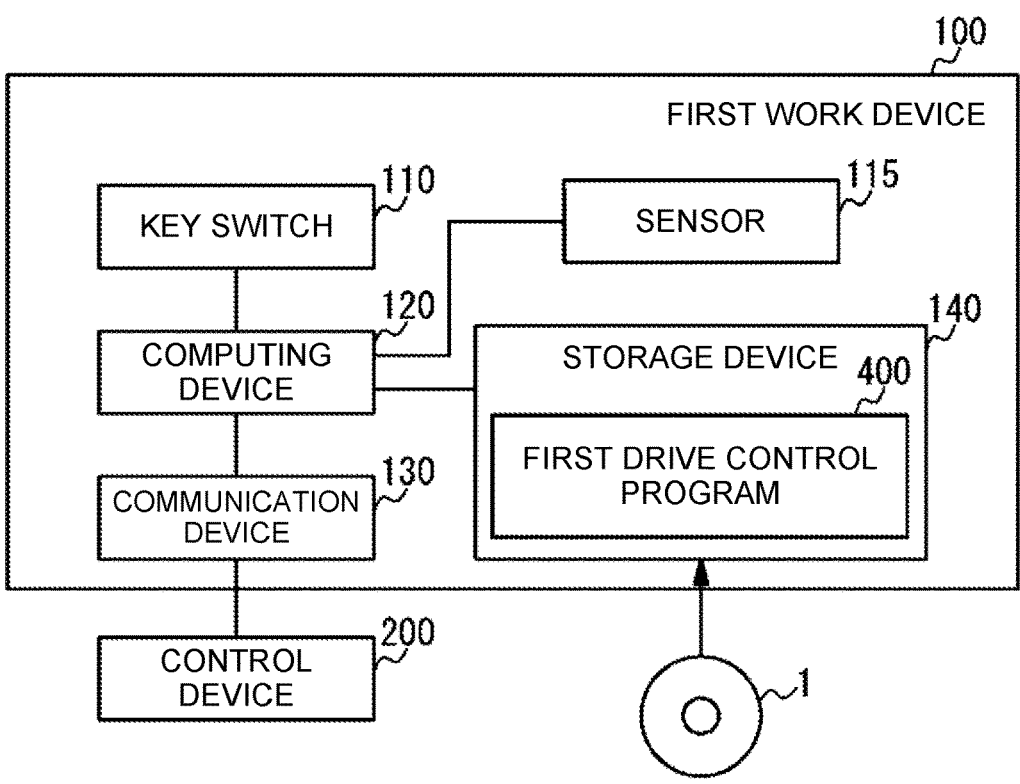
FIG. 4 is a diagram illustrating a configuration of the first work device in the embodiment.

As illustrated in FIG. 4, the first work device 100 includes a key switch 110, a sensor 115, a computing device 120, a communication device 130, and a storage device 140. The key switch 110 generates signals to start and stop an engine of the first work device 100. For example, when the key switch 110 is set to "ON", the engine of the first work device 100 is started and a signal representing that the engine has been started is output to the computing device 120. When the key switch 110 is set to "OFF", the engine of the first work device 100 is stopped and a signal representing that the engine has been stopped is output to the computing device 120. The key switch 110 may be formed by any switch, as long as the key switch 110 accepts instructions to start and stop the engine.

The sensor 115 acquires operation information representing a state of the first work device 100. For example, the operation information includes position information representing a position of the first work device 100. The sensor 115 includes a positioning device that measures the position of the first work device 100 at each time. The positioning device is, for example, a global navigation satellite system (GNSS).

The operation information also includes state information representing the state of the first work device 100, such as a speed, steering angle, engine revolution speed, and ON/OFF status of various clutches of the first work device 100. For example, in a case where the first work device 100 is a vehicle that tows a working machine, the state information may include a power take-off (PTO) speed at the time of transmitting power to the working machine, a hitch height and a lift arm angle indicating a posture of the working machine. In this case, the sensor 115 includes a measurement device that measures each piece of information.

The communication device 130 communicates with the control device 200. The communication device 130 transfers the information acquired from the control device 200 to the computing device 120. The communication device 130 transfers signals generated by the computing device 120 to the control device 200. The communication device 130 includes, for example, a transmitter/receiver used in wireless communication such as a wireless local area network (LAN) and a cellular network, and various interfaces such as a network interface card (NIC) and a universal serial bus (USB).

The storage device 140 stores various data for controlling the first work device 100, for example, a first drive control program 400. The storage device 140 is used as a non-transitory tangible storage medium for storing the first drive control program 400. The first drive control program 400 may be provided as a computer program product recorded on a computer-readable storage medium 1, or may be provided as a computer program product that can be downloaded from a server.

The computing device 120 reads and executes the first drive control program 400 from the storage device 140 to perform various data processing to control the first work device 100. For example, the computing device 120 includes a central processing device (CPU; Central Processing Unit), an engine control unit (ECU), and the like.

Figure 5:
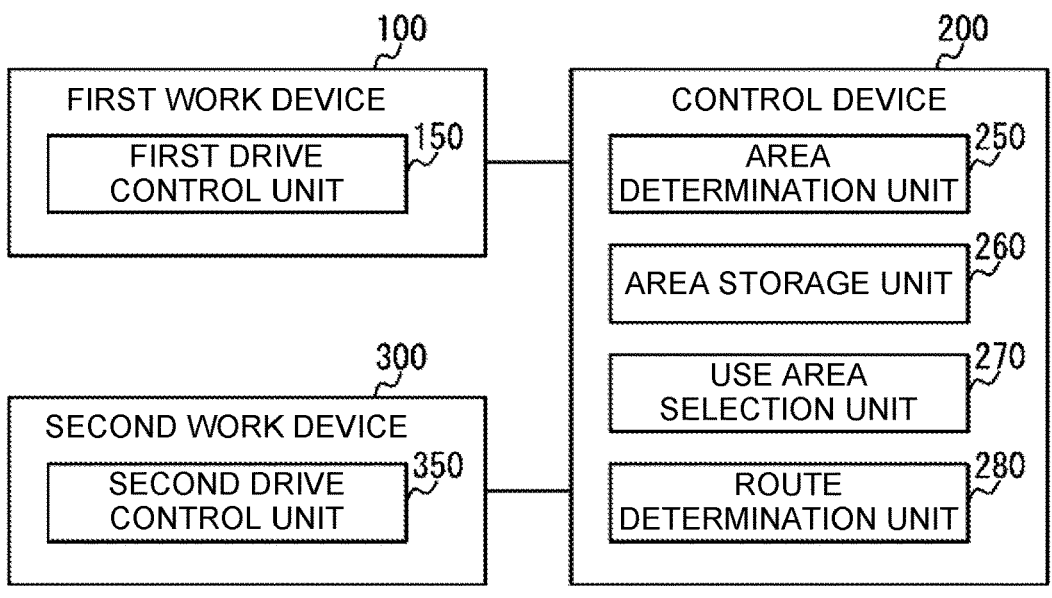
FIG. 5 is a diagram illustrating a functional block executed by the work area management system in the embodiment.

The computing device 120 reads and executes the first drive control program 400 to realize a first drive control unit 150, as illustrated in FIG. 5. The first drive control unit 150 controls a speed, traveling direction, etc. of the first work device 100 so that the first work device 100 moves along a specified route.

Figures 6, 7:
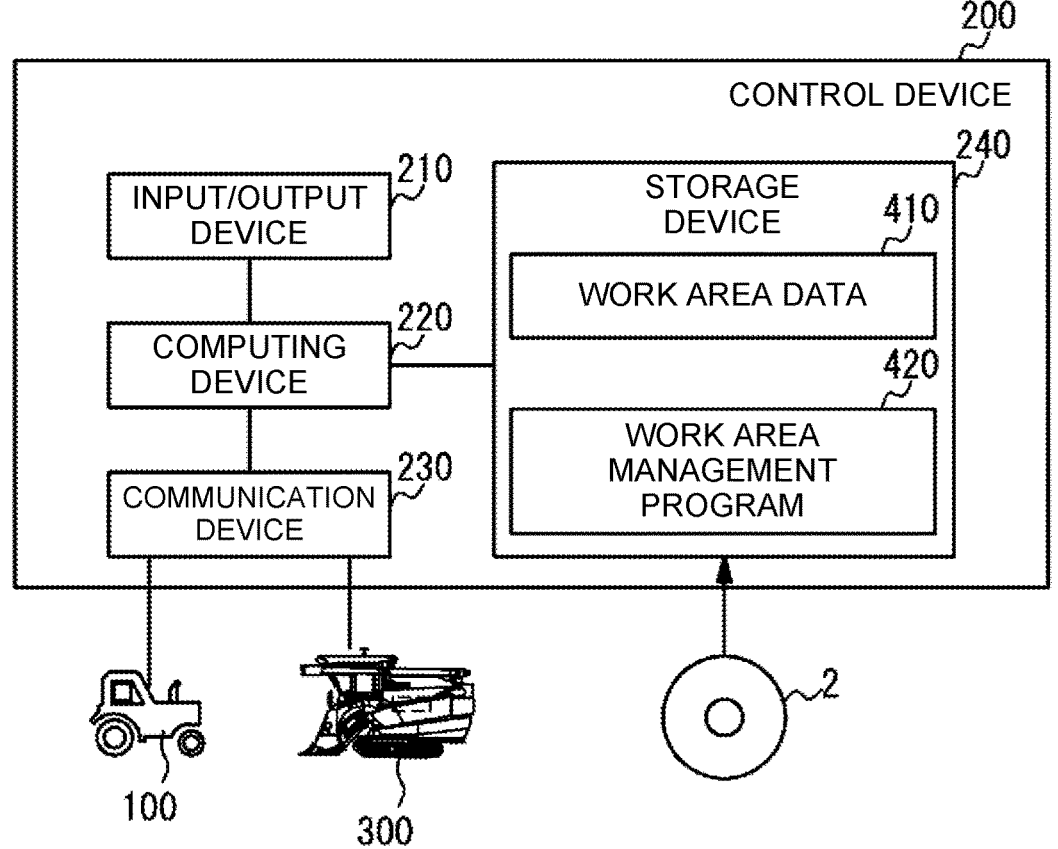
FIG. 6 is a diagram illustrating a configuration of a control device in the embodiment.
FIG. 7 is a diagram illustrating a configuration of work area data in the embodiment.

Next, a description will be made on a configuration of the control device 200 illustrated in FIG. 1. As illustrated in FIG. 6, the control device 200 includes an input/output device 210, a computing device 220, a communication device 230, and a storage device 240. The control device 200 includes a computer, a portable terminal such as a tablet. The input/output device 210 receives information that is used by the computing device 220 to execute processing. In addition, the input/output device 210 outputs a result of the processing executed by the computing device 220. The input/output device 210 includes various input devices and various output devices, and examples of the input/output device 210 are a keyboard, a mouse, a microphone, a display, a speaker, and a touch panel.

The communication device 230 communicates with a plurality of work devices, for example, the first work device 100 and the second work device 300. The communication device 230 transfers information acquired from the first work device 100 or the second work device 300 to the computing device 220. The communication device 230 also transfers signals generated by the computing device 220 to the first work device 100 or the second work device 300. The communication device 230 includes, for example, a transmitter/receiver used in wireless communication such as a wireless local area network (LAN) and a cellular network, and various interfaces such as a network interface card (NIC) and a universal serial bus (USB).

The storage device 240 stores various data, for example, work area data 410 and a work area management program 420, for determining work routes when a plurality of work devices, for example, the first work device 100 and the second work device 300, perform work. The storage device

240 is used as a non-transitory tangible storage medium to store the work area management program 420. The work area management program 420 may be provided as a computer program product that is recorded on a computer-readable storage medium 2, or may be provided as a computer program product that can be downloaded from a server.

The work area data 410 stores area information related to a work area where work is performed by a plurality of work devices. For example, as illustrated in FIG. 7, the work area data 410 stores an area position, an area shape, a model of the work device, a registration date, and a final use date for each registered work area. The area position represents a position of the registered work area, for example, a geometric center of the work area. The area shape represents a shape of the registered work area, for example, latitudes and longitudes of the plurality of vertices of a contour of the work area. The area position may be represented by positions of a plurality of vertices of the contour of the work area.

The model of the work device represents a model of the work device used when the work area is registered. For example, when the work area is registered by the first work device 100 moving along the contour 510 of the field 500, the model of the work device for this work area represents the model of the first work device 100, for example, a tractor.

The registration date represents a date when the work area was registered. The final use date represents a final date among dates when a work route was determined using corresponding area information.

The computing device 220 illustrated in FIG. 6 reads and executes the work area management program 420 from the storage device 240 to perform various data processing to determine the work route of the work device. For example, the computing device 220 includes a central processing device (CPU; Central Processing Unit) and the like.

By reading and executing the work area management program 420, as illustrated in FIG. 5, the computing device 220 realizes an area determination unit 250, an area storage unit 260, a use area selection unit 270, and a route determination unit 280. The area determination unit 250 determines a work area in which a work device performs work on the basis of a measured positioning position of the work device, for example, the first work device 100. The area storage unit 260 stores area information representing the work area determined by the area determination unit 250 in the work area data 410. The use area selection unit 270 selects area information to be used when determining a work route of a work device, for example, the second work device 300. The route determination unit 280 determines a work route for a work device, for example, the first work device 100 or the second work device 300, to perform work in the field 500 on the basis of the area information.

Next, a description will be made on a configuration of the second work device 300 illustrated in FIG. 1. The second work device 300 represents any device that performs work in the field 500 and differs from the first work device 100. The work performed by the second work device 300 may be different from or the same as the work performed by the first work device 100. The second work device 300 includes a device that is integrally configured with a work machine, and an example of such a device includes a combine harvester. The second work device 300 may include a rice transplanter. The second work device 300 may also include a tractor that tows a work machine such as a rotary cultivator, a fertilizer, or the like to perform work. The second work device 300 may include a device that flies and performs work, for example, a drone that sprays pesticides.

Figure 8:
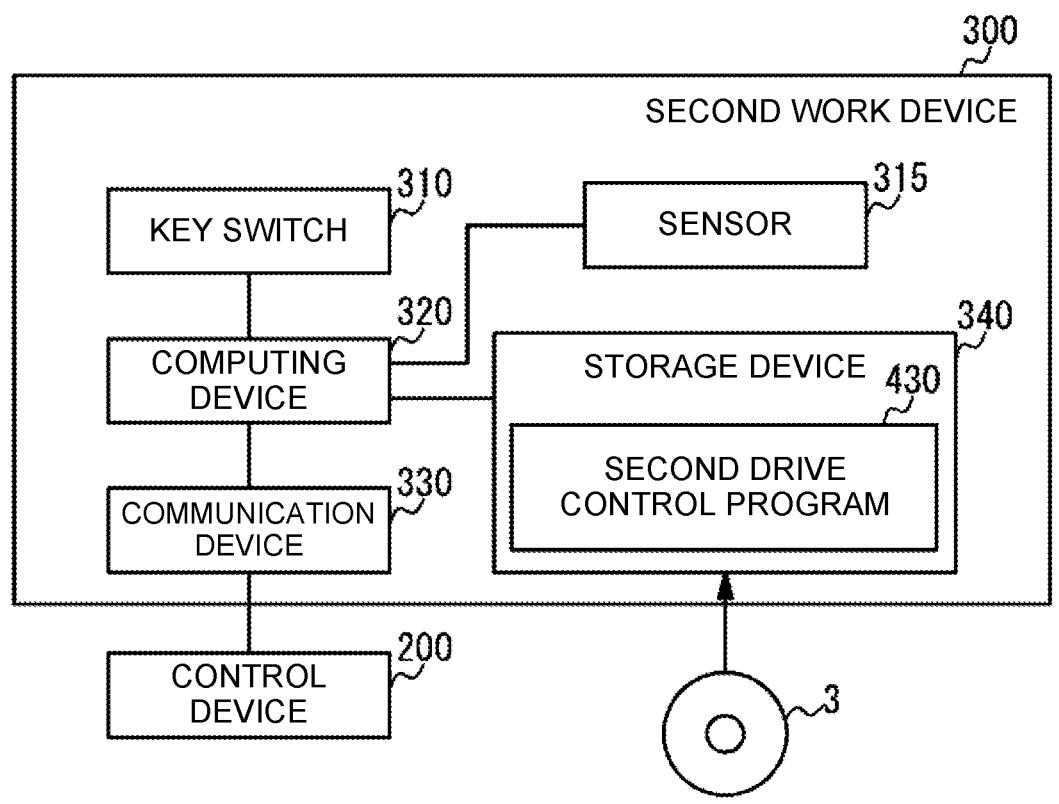
FIG. 8 is a diagram illustrating a configuration of the second work device in the embodiment.

As illustrated in FIG. 8, the second work device 300 includes a key switch 310, a sensor 315, a computing device 320, a communication device 330, and a storage device 340. The key switch 310, similar to the key switch 110 of the first work device 100, generates signals to start and stop an engine of the second work device 300. For example, when the key switch 310 is set to "ON," the engine of the second work device 300 is started and a signal representing that the engine has been started is output to the computing device 320. When the key switch 310 is set to "OFF", the engine of the second work device 300 is stopped and a signal representing that the engine has been stopped is output to the computing device 320. The key switch 310 may be formed by any switch, as long as the key switch 310 accepts instructions to start and stop the engine.

The sensor 315, similar to the sensor 115 of the first work device 100, acquires operation information representing a state of the second work device 300. For example, the operation information includes position information representing a position of the second work device 300 and state information representing the state of the second work device 300.

The communication device 330, similar to the communication device 130 of the first work device 100, communicates with the control device 200. The communication device 330 transfers the information acquired from the control device 200 to the computing device 320. In addition, the communication device 330 transfers signals generated by the computing device 320 to the control device 200.

The storage device 340, similar to the storage device 140 of the first work device 100, stores various data for controlling the second work device 300, for example, a second drive control program 430. The storage device 340 is used as a non-transitory tangible storage medium for storing the second drive control program 430. The second drive control program 430 may be provided as a computer program product recorded on a computer-readable storage medium 3, or may be provided as a computer program product that can be downloaded from a server.

The computing device 320, similar to the computing device 120 of the first work device 100, reads and executes the second drive control program 430 from the storage device 340 and performs various data processing to control the second work device 300. For example, the computing device 320 includes a central processing device (CPU; Central Processing Unit), an engine control unit (ECU), and the like.

The computing device 320 reads and executes the second drive control program 430 to realize a second drive control unit 350, as illustrated in FIG. 5. The second drive control unit 350 controls a speed, traveling direction, etc. of the second work device 300 so that the second work device 300 moves along a specified route.

(Operation of Work Area Management System)

The work area management system 1000 controls the first work device 100 so that the first work device 100 works autonomously in the field 500. For example, when the first work device 100 performs work in the field 500, the user inputs an operation to the input/output device 210 of the control device 200 to start work by the first work device 100. The computing device 220 of the control device 200 reads and executes the work area management program 420 when an operation by the user is input. When the work area management program 420 is read and executed, the computing device 220 starts processing illustrated in FIG. 9, which is part of a work area management method.

In step S110, the area determination unit 250, which is realized by the computing device 220, instructs the operator to move the first work device 100 by manual steering along a route that makes one round along the contour of the work area, such as the contour 510 of the field 500 for one time, as illustrated in FIGS. 2 and 3. The operator steers the first work device 100 to make the first work device 100 move along the contour of the work area. The first drive control unit 150 of the first work device 100 measures the position of the first work device 100 at each time and outputs position information representing the measured position at each time to the control device 200. The first drive control unit 150 outputs state information representing a state of the first work device 100 at each time to the control device 200. The area determination unit 250 of the control device 200 acquires operation information including the position information and the state information from the first work device 100.

Figure 9:
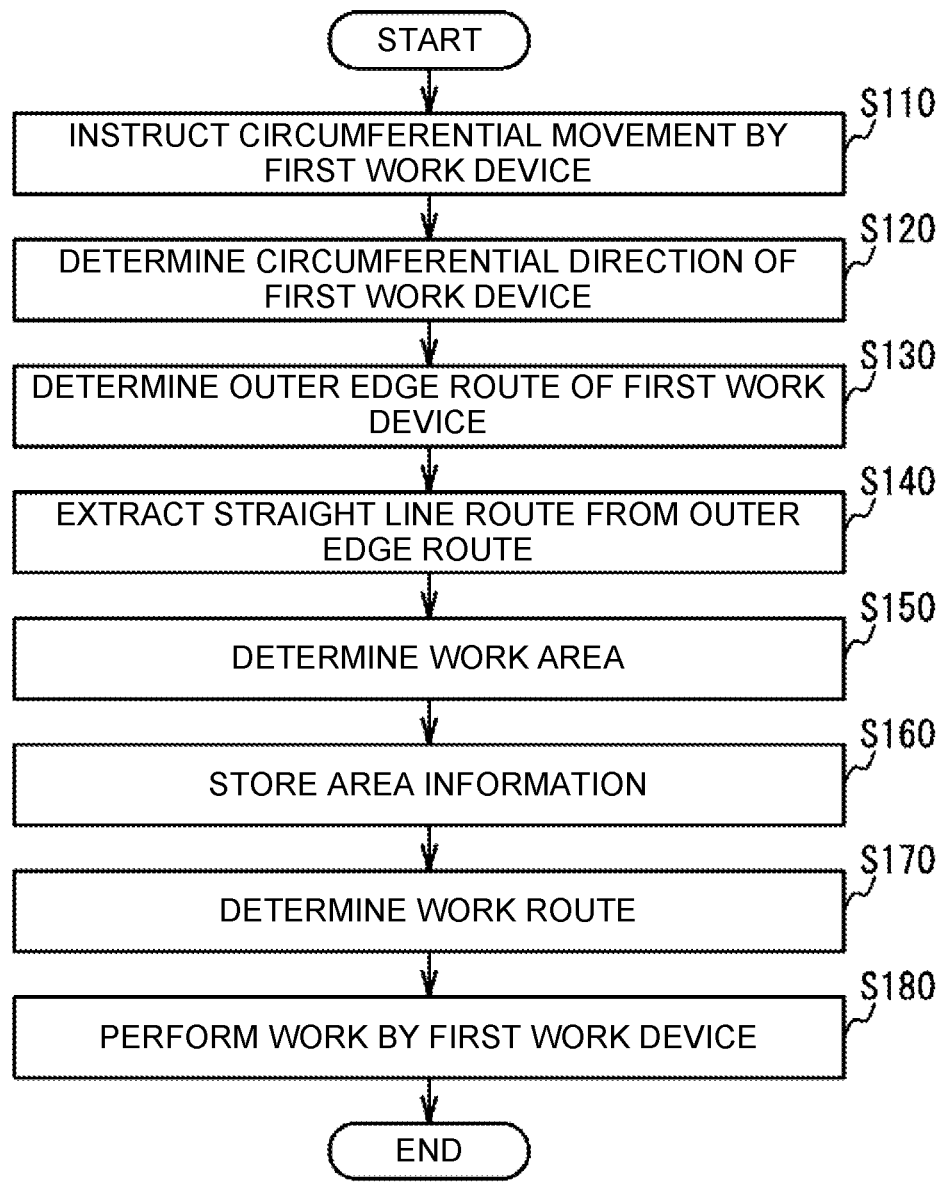
FIG. 9 is a flowchart illustrating processing of registering a work area and determining a work route by the work area management system in the embodiment.

In step S120 illustrated in FIG. 9, the area determination unit 250 determines a circumferential direction of the first work device 100. For example, the area determination unit 250 determines the circumferential direction of the first work device 100 on the basis of a steering angle of the first work device 100 at each time. For example, as illustrated in FIG. 2, when the first work device 100 circulates the work area in a counterclockwise direction, the steering angle of the first work device 100 is frequently pointing to left. Therefore, the area determination unit 250 determines the circumferential direction of the first work device 100 by integrating the steering angles at each time of the first work device 100.

Figure 10:
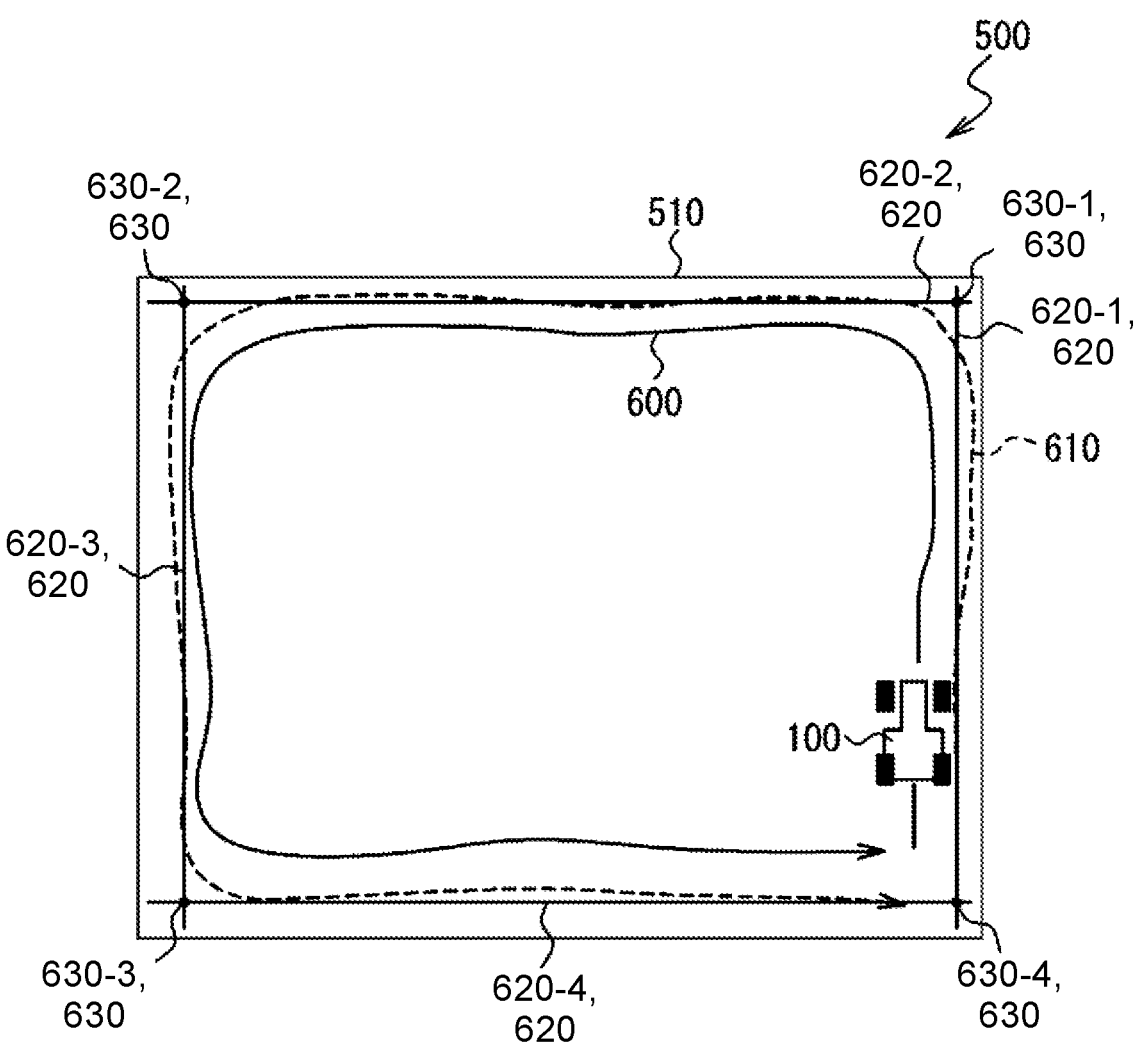
FIG. 10 is a diagram for explaining the processing for registering a work area in the embodiment.

In step S130 illustrated in FIG. 9, the area determination unit 250 determines an outer edge route 610 of the first work device 100 on the basis of the circumferential direction and the position information of the first work device 100. The outer edge route 610 represents a route that an outer edge of the first work device 100 passes through when the first work device 100 moves along the registration route 600, as illustrated in FIG. 10. For example, the area determination unit 250 stores in advance a left side distance from a position of the positioning device of the first work device 100 to a left end of the first work device 100 and a right side distance from the position of the positioning device to a right end of the first work device 100 in a direction orthogonal to the traveling direction of the first work device 100. When the circumferential direction of the first work device 100 is counterclockwise, the area determination unit 250 determines a route that is distant from the registration route 600 by the right side distance to right with respect to the traveling direction of the first work device 100 as the outer edge route 610. When the circumferential direction of the first work device 100 is clockwise, the area determination unit 250 determines a route that is distant from the registration route 600 by the left side distance to left with respect to the traveling direction of the first work device 100 as the outer edge route 610. The left side distance and the right side distance may be determined by adding a predetermined distance from the position of the positioning position to the corresponding end of the first work device 100. The registration route 600 represents, for example, a route connecting the positions of the first work device 100 with straight line segments in the order of the measured time.

In step S140 illustrated in FIG. 9, the area determination unit 250 extracts, from the outer edge route 610, the straight line routes along which the first work device 100 moved in a straight line. The area determination unit 250 extracts straight line routes by any method. For example, the area determination unit 250 determines an area that is sandwiched between two straight lines that extend in the traveling direction and pass through the left or right end of the first work device 100 at the end of the turning travel of the first work device 100. When the outer edge route 610 of the first work device 100 included in the determined area is longer than a threshold value, the area determination unit 250 extracts the outer edge route 610 of the first work device 100 included in the area as a straight line route.

In step S150, the area determination unit 250 determines a work area where work is to be performed by the first work device 100. For example, as illustrated in FIG. 10, the area determination unit 250 determines approximate straight lines 620 that approximate the extracted straight line routes. The area determination unit 250 determines a vertex 630 where the approximate straight lines 620 corresponding to two temporally adjacent straight line routes intersect among the determined approximate straight lines 620. An intersection of the approximate straight line 620 corresponding to a temporally last straight line route and the approximate straight line 620 corresponding to a temporally first straight line route is added to the vertex 630. The area determination unit 250 determines, as a temporary work area, a polygon that has the determined plurality of vertices 630 as vertices and edges extending onto the approximate straight lines 620. The area determination unit 250 displays information representing the determined temporary work area on the input/output device 210 to accept a modification operation of the work area by the user. The area determination unit 250 modifies the work area in response to the modification operation by the user.

Figure 11:
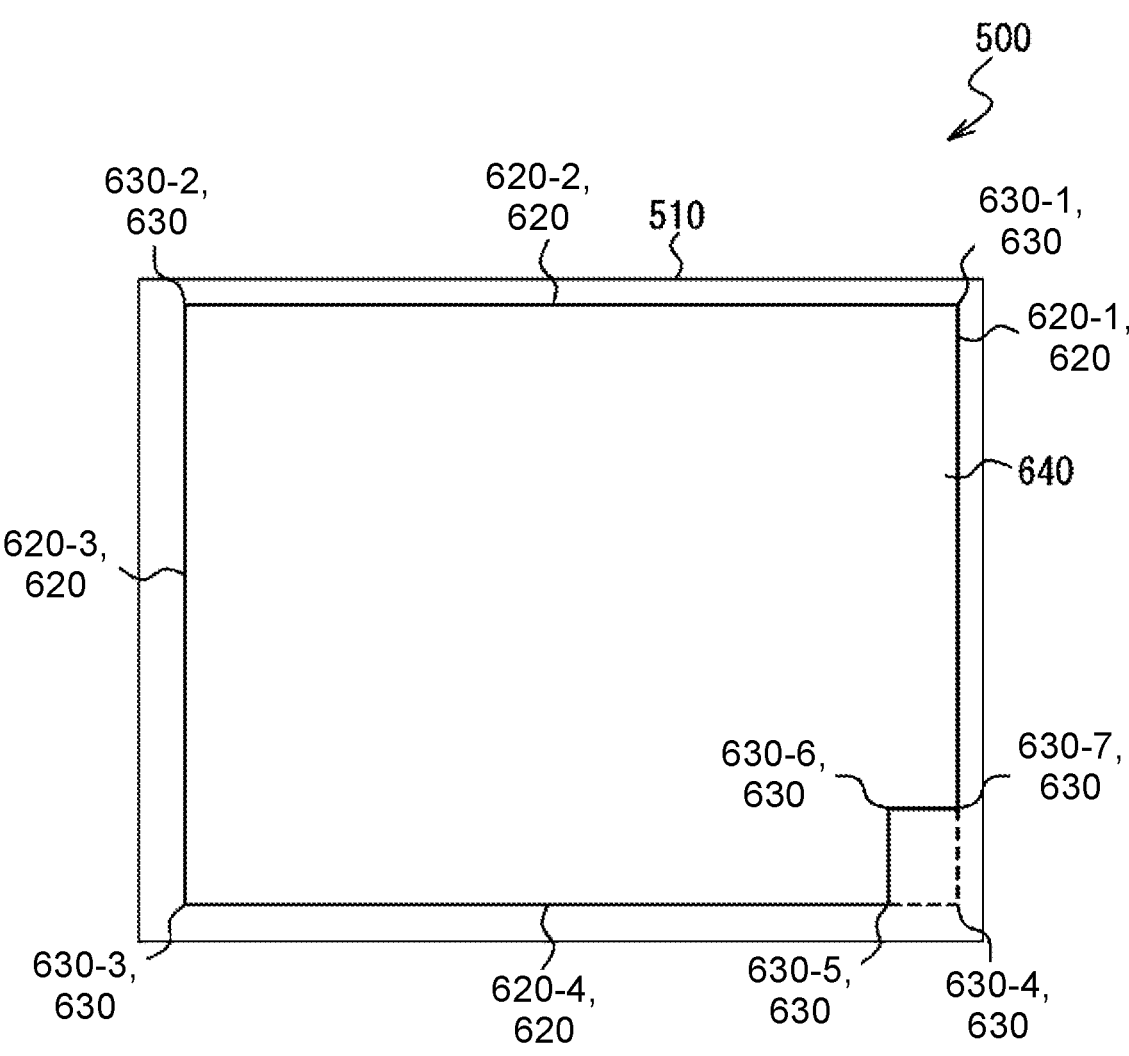
FIG. 11 is a diagram illustrating a determined work area in the embodiment.

For example, the area determination unit 250 selects a first approximate straight line 620-1 and a second approximate straight line 620-2 as approximate straight lines 620 corresponding to two temporally adjacent straight line routes. The area determination unit 250 determines a first vertex 630-1 where the selected first approximate straight line 620-1 and the second approximate straight line 620-2 intersect. Similarly, the area determination unit 250 selects the second approximate straight line 620-2 and a third approximate straight line 620-3, and determines a second vertex 630-2 where the two selected approximate straight lines 620 intersect. In addition, the area determination unit 250 determines a third vertex 630-3 where the third approximate straight line 620-3 and a fourth approximate straight line 620-4 intersect, and a fourth vertex 630-4 where the fourth approximate straight line 620-4 and the first approximate straight line 620-1 intersect. As illustrated in FIG. 11, the area determination unit 250 determines, as a temporary work area, a polygon that has the first vertex 630-1, the second vertex 630-2, the third vertex 630-3, and the fourth vertex 630-4 as vertices and is surrounded by the approximate straight lines 620.

An image representing the determined temporary work area on a map is displayed on the input/output device 210. When the determined temporary work area is correct, the user inputs, to the input/output device 210, an operation that stores the determined temporary work area. When the determined temporary work area is incorrect, the user inputs, to the input/output device 210, a modification operation for the work area. For example, the user modifies the temporary work area to exclude an entrance from a farm road to the field 500 from the work area, as illustrated in FIG. 11. Specifically, the user inputs operations to add vertices 630, for example, a fifth vertex 630-5, a sixth vertex 630-6, and a seventh vertex 630-7. The user also inputs an operation to delete a vertex 630, for example, the fourth vertex 630-4. The area determination unit 250 modifies the temporary work area on the basis of the input operations. The area determination unit 250 determines, as a work area 640, a polygon that has the first vertex 630-1, the second vertex 630-2, the third vertex 630-3, the fifth vertex 630-5, the sixth vertex 630-6, and the seventh vertex 630-7 as vertices.

In step S160 illustrated in FIG. 9, the area storage unit 260 stores area information representing the determined work area 640 in the work area data 410. For example, the area storage unit 260 acquires information representing the position and shape of the work area 640 from the area determination unit 250 and stores the acquired information in the work area data 410. The area storage unit 260 also stores a current date in the work area data 410 in association with the information representing the work area 640.

Figure 12:
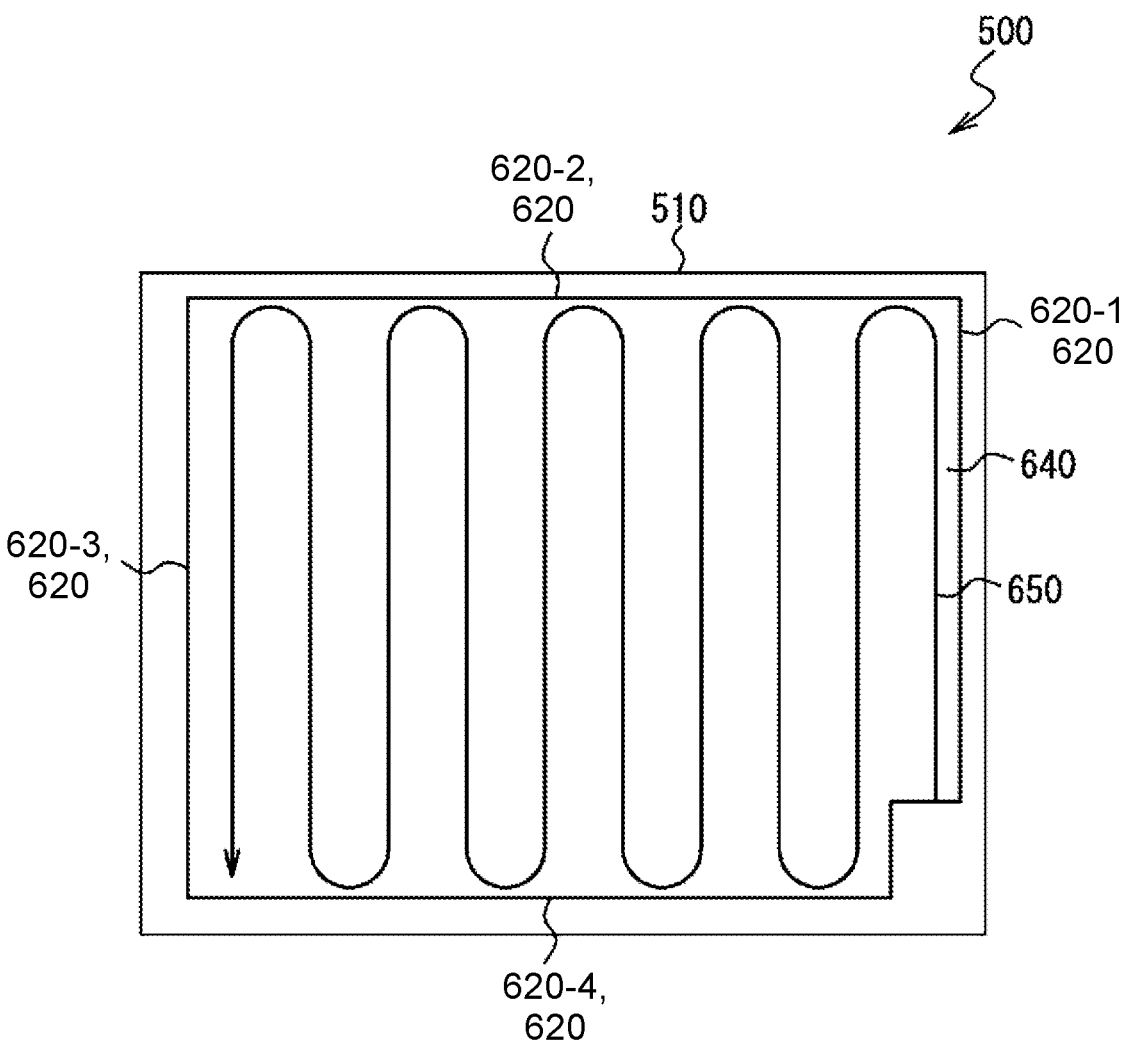
FIG. 12 is a diagram illustrating a work route of the first work device in the embodiment.

In step S170, the route determination unit 280 determines a work route 650 for the first work device 100 to work on the basis of the determined work area 640. For example, the route determination unit 280 determines the work route 650, as illustrated in FIG. 12, along which work is performed while reciprocating within the work area 640. The work route 650 represents, for example, a route that moves from the first approximate straight line 620-1 to the third approximate straight line 620-3 while reciprocating between the fourth approximate straight line 620-4 and the second approximate straight line 620-2, which are opposed to each other. The route determination unit 280 outputs route information representing the determined work route 650 to the first work device 100. In addition, the route determination unit 280 updates, in the work area data 410, the final use date of the area information corresponding to the work area 640 to a date when the work route 650 is determined.

In step S180 illustrated in FIG. 9, the first drive control unit 150 of the first work device 100 controls the first work device 100 so that the first work device 100 moves and works along the work route 650 represented in the acquired route information.

Thus, the work area management system 1000 determines the work area 640 on the basis of a circumferential route of the first work device 100 and controls the first work device 100 so that the first work device 100 performs work in the determined work area 640.

The route determination unit 280 of the control device 200 determines a work route along which the second work device 300 performs work in the field 500 using area information on the work area 640 registered by using the first work device 100. For example, when the second work device 300 performs work in the field 500, the user inputs an operation to the input/output device 210 of the control device 200 to start work by the second work device 300. The computing device 220 of the control device 200 reads and executes the work area management program 420 when an operation by the user is input. When the work area management program 420 is read and executed, the computing device 220 starts processing illustrated in FIG. 13, which is part of a work area management method.

In step S210, the use area selection unit 270 accepts candidate area information used to determine a work route of the second work device 300. For example, the use area selection unit 270 displays a list of area information stored in the work area data 410 on the input/output device 210. From the list of displayed area information, the operator selects area information to be used for determining the work route of the second work device 300 as candidate area information.

In step S220, the use area selection unit 270 determines whether the candidate area information is suitable for determining the work route of the second work device 300. When the candidate area information is suitable for determining the work route of the second work device 300, the use area selection unit 270 performs processing of step S240. When the candidate area information is unsuitable for determining the work route of the second work device 300, the use area selection unit 270 performs processing of step S230.

For example, when the candidate area information satisfies a predetermined condition, the use area selection unit 270 determines that the candidate area information is suitable for determining the work route of the second work device 300. For example, the predetermined condition includes that a predetermined period of time or longer has not elapsed since the candidate area information was registered. For example, the use area selection unit 270 acquires, from the work area data 410, information representing a registration date illustrated in FIG. 7. When a predetermined period of time or longer, for example, five years or longer, has not elapsed since the registration date, the use area selection unit 270 determines that the candidate area information is suitable for determining the work route of the second work device 300.

In the examples illustrated in FIG. 7, the area information whose area positions are "A" and "B" is determined to be unsuitable for determining the work route of the second work device 300 because a predetermined period of time or longer has elapsed since the area information was registered. The area information whose area position is "C" is determined to be suitable for determining the work route of the second work device 300, because a predetermined period of time or longer has not elapsed since the area information was registered. In some cases, the work area 640 may change. For example, the work area 640 changes in accordance with changes in the field 500 due to the joining or dividing of the field 500. The work area 640 may change due to a change in position of a facility in the field 500, such as an entrance for the second work device 300 to enter the field 500, a water intake, or the like. Including the elapsed period of time since the candidate area information was registered in the predetermined condition reduces the use of work area 640 that have changed since being registered.

Even if a predetermined period of time or longer has elapsed since registration, when an elapsed period of time since last use is short, it is highly possible that the work area 640 has not changed. Therefore, the predetermined condition may include that a predetermined period of time or longer has not elapsed since the candidate area information was last used. The use area selection unit 270 acquires, from the work area data 410, the information representing the final use date illustrated in FIG. 7. When a predetermined period of time or longer, for example, two years or longer, has not elapsed since the final use date, the use area selection unit 270 determines that the candidate area information is suitable for determining the work route of the second work device 300.

In the example illustrated in FIG. 7, the area information whose area position is "A" is determined to be unsuitable for determining the work route of the second work device 300 because a predetermined period of time or longer has elapsed since the area information was used. The area information whose area positions are "B" and "C" is determined to be suitable for determining the work route of the second work device 300 because a predetermined period of time or longer has not elapsed since the area information was used.

The use area selection unit 270 may also determine whether the candidate area information is suitable for determining the work route of the second work device 300 on the basis of accuracy of the work area 640 represented in the candidate area information. For example, the longer the distance from the vertex 630 to the outer edge route 610 illustrated in FIG. 10, the lower the accuracy of the vertex 630 of the work area 640 may be. Therefore, the use area selection unit 270 may determine whether the candidate area information is suitable for determining the work route of the second work device 300 on the basis of the distance from the vertex 630 to the outer edge route 610 illustrated in FIG. 10. For example, the use area selection unit 270 determines that the candidate area information is suitable for determining the work route of the second work device 300 when the distance from the vertex 630 to the outer edge route 610 is smaller than a threshold value. In this case, the predetermined condition for determining appropriateness of determining the work route includes that the distance from the vertex 630 to the outer edge route 610 is smaller than a threshold value.

For example, as illustrated in FIGS. 2 and 3, the accuracy of the work area 640 varies according to the model of work device used to register the work area 640. For example, in many cases, the accuracy of the work area 640 registered using a rice transplanter is higher than that of the work area 640 registered using a tractor. In addition, in many cases, the accuracy of the work area 640 registered using a combine harvester is higher than that of the work area 640 registered using a rice transplanter. Therefore, the use area selection unit 270 may acquire the model of the work device used for registration from the work area data 410 and determine whether it is suitable for determining the work route of the second work device 300.

For example, the use area selection unit 270 stores a first unsuitable model group that represents a list of models that are unsuitable for determining the work route. When the model of the work device used for registration is included in the first unsuitable model group, the use area selection unit 270 determines that the candidate area information is unsuitable for determining the work route of the second work device 300. The first unsuitable model group may include, for example, a tractor. In this case, the predetermined condition for determining the appropriateness of determining the work route includes that the model of the work device used for registration is not included in the first unsuitable model group.

In addition, the use area selection unit 270 may also determine whether the candidate area information is suitable for determining the work route of the second work device 300 on the basis of the model of the work device whose work route is to be determined, for example, the model of the second work device 300 and the model of the work device used for registration. For example, the use area selection unit 270 stores, for the work device whose work route is to be determined, a second unsuitable model group which represents a list of models that are unsuitable in determining the work route. The use area selection unit 270 acquires information representing the model of the second work device 300 whose work route is to be determined. For example, information representing the model of the second work device 300 may be input into the input/output device 210 of the control device 200 by the operator or may be acquired from the second work device 300. The use area selection unit 270 acquires a second unsuitable model group corresponding to the model of the second work device 300. When the model of the work device used for registration is included in the second unsuitable model group, the use area selection unit 270 determines that the candidate area information is unsuitable for determining the work route of the second work device 300. In this case, the predetermined condition for determining the appropriateness of determining the work route includes that the model of the work device used for registration is not included in the second unsuitable model group corresponding to the model of the second work device 300 whose work route is to be determined.

For example, when determining a work route for a combine harvester, the second unsuitable model group may include, for example, a tractor and a rice transplanter. When determining a work route for a rice transplanter, the second unsuitable model group may include, for example, a tractor. When determining a work route for a tractor, the second unsuitable model group need not include any models.

The use area selection unit 270 may determine that the candidate area information is suitable for determining the work route of the second work device 300 when all of the plurality of predetermined conditions are satisfied, or may determine that the candidate area information is suitable for determining the work route of the second work device 300 when some of the predetermined conditions are satisfied.

Figure 13:
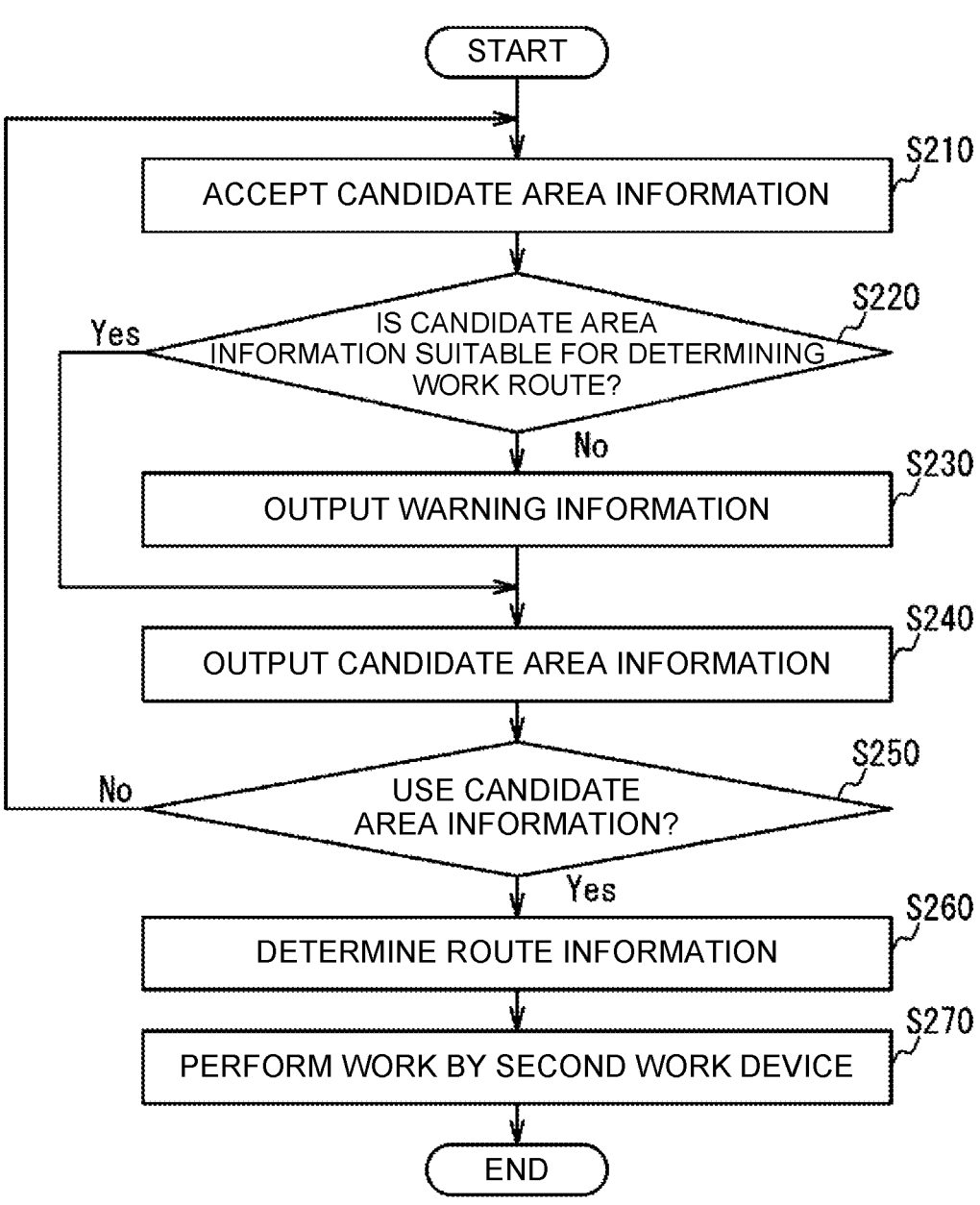
FIG. 13 is a flowchart illustrating processing by which the work area management system selects a work area to be used for determining a work route from the registered work areas in the embodiment.

When it is determined that the candidate area information is unsuitable for determining the work route, in step S230 illustrated in FIG. 13, the use area selection unit 270 outputs warning information to the input/output device 210 to inform the operator that the selected candidate area information is unsuitable for determining the work route. The warning information may include a reason for the unsuitable determination, for example, information representing conditions that the candidate area information does not satisfy.

In step S240, the use area selection unit 270 outputs the selected candidate area information to the input/output device 210. For example, the use area selection unit 270 displays, on the input/output device 210, an image that represents the work area 640 represented by the selected candidate area information on a map. The operator checks the output candidate area information and decides whether to use the candidate area information to determine the work route of the second work device 300.

In step S250, the use area selection unit 270 accepts the operator's decision to use the candidate area information. If the operator decides to use the candidate area information, he/she inputs, to the input/output device 210, an operation indicating that the candidate area information is to be used to determine the work route. If the operator decides not to use the candidate area information, he/she inputs, to the input/output device 210, an operation representing that the candidate area information is not to be used. When an operation representing that candidate area information is to be used is input, the processing moves to step S260. When an operation representing that the candidate area information is not to be used is input, the processing returns to step S210 to repeat the above-mentioned processing.

Figure 14:
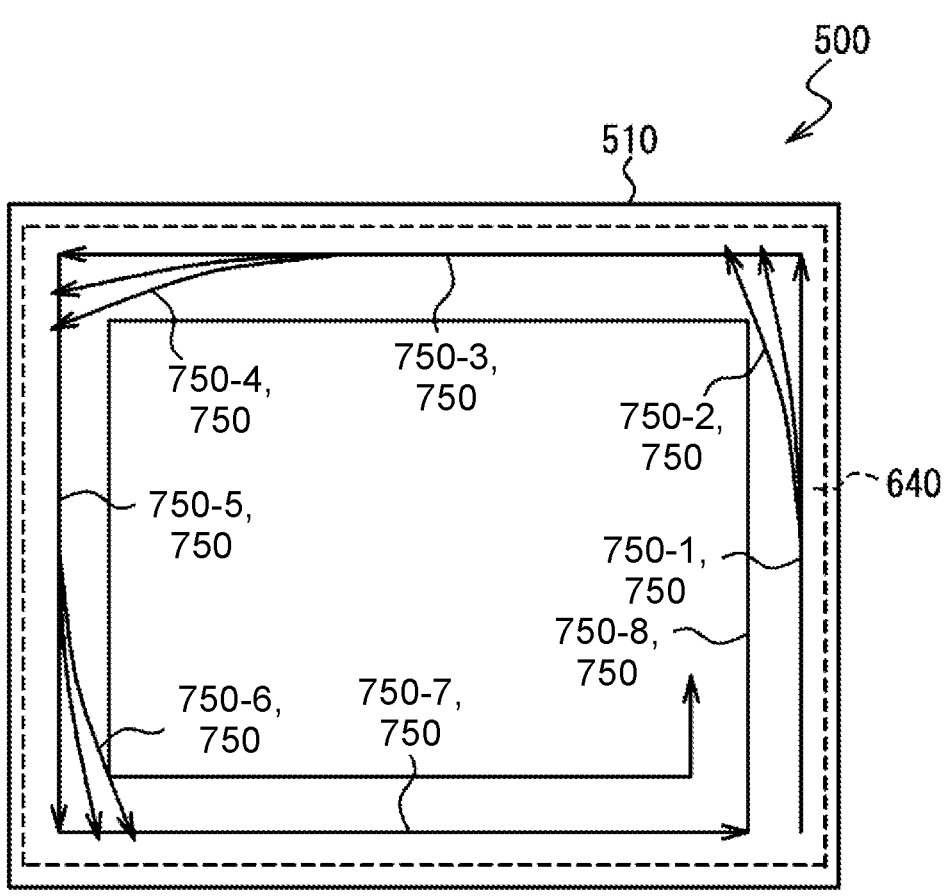
FIG. 14 is a diagram illustrating a work route of the second work device in the embodiment.

In step S260, the route determination unit 280 determines a work route for the second work device 300 to perform work on the basis of the candidate area information. For example, as illustrated in FIG. 14, the route determination unit 280 determines a work route 750 along which the second work device 300 moves to perform work in the work area 640 registered using the first work device 100.

For example, the work route 750 includes a first work route 750-1, a third work route 750-3, a fifth work route 750-5, and a seventh work route 750-7 that move in a straight line along the contour 510 of the field 500. The work route 750 also includes a second work route 750-2, a fourth work route 750-4, and a sixth work route 750-6 that repeatedly move forward and backward to shift inward in the field 500. Furthermore, the work route 750 includes an eighth work route 750-8 that moves toward a center of the field 500 while circulating along the contour 510 of the field 500. The route information representing the determined work route 750 is output to the second work device 300. In addition, the route determination unit 280 updates the final use date of the area information corresponding to work area 640 in the work area data 410 to a date when the work route 750 was determined.

In step S270 illustrated in FIG. 13, the second drive control unit 350 of the second work device 300 controls the second work device 300 so that the second work device 300 moves and works along the work route 750 represented in the acquired route information. For example, the second drive control unit 350 controls the second work device 300 to make the second work device 300 move along the route from the first work route 750-1 to the eighth work route 750-8.

Thus, the work area management system 1000 controls the second work device 300 so that the second work device 300 performs work in the work area 640 determined on the basis of the circumferential route of the first work device 100.

Modified Examples

The configuration described in the embodiment is an example, and can be modified to an extent that does not interfere with the functions. For example, in step S120 illustrated in FIG. 9, the area determination unit 250 of the control device 200 may determine the circumferential direction on the basis of changes in the traveling direction of the first work device 100. For example, as illustrated in FIG. 2, when the first work device 100 circulates the work area in a counterclockwise direction, the traveling direction of the first work device 100 frequently changes to the left. Therefore, the area determination unit 250 determines the circumferential direction of the first work device 100 by integrating the changes in the traveling direction of the first work device 100 at each time. Here, the traveling direction of the first work device 100 is determined on the basis of, for example, two positional information that are measured continuously over time.

In step S220 illustrated in FIG. 13, the use area selection unit 270 of the control device 200 may use any values representing a distance from the vertex 630 to the route of the first work device 100 as the accuracy of the work area 640 represented in the candidate area information, and is not limited to the distance from the vertex 630 to the outer edge route 610. For example, the use area selection unit 270 may represent the accuracy of the work area 640 by a distance from the vertex 630 to the registration route 600. The accuracy of the work area 640 may be represented by a distance from a measured positioning position that is closest to the vertex 630 among the measured positioning positions of the first work device 100 to the vertex 630. The accuracy of the work area 640 may be represented by a distance from an outer edge position that is closest to the vertex 630 among the outer edge positions on the outer edge route 610 relative to the positioning positions of the first work device 100 to the vertex 630. Here, the outer edge position represents a position of an outside end of the first work device 100 when the positioning position of the first work device 100 is measured. The outer edge position represents, for example, a position of a right end of the first work device 100 when the circumferential direction is counterclockwise, and a position of a left end of the first work device 100 when the circumferential direction is clockwise.

The accuracy of the work area 640 may be represented by a statistically determined value, such as a maximum, minimum, average, or median value, in a plurality of values representing the distances from the plurality of vertices 630 to the route of the first work device 100. For example, the use area selection unit 270 determines that the larger the value representing the distance, the lower the accuracy of the work area 640 is.

In step S210 illustrated in FIG. 13, the use area selection unit 270 of the control device 200 may limit the list of area information to be displayed on the input/output device 210 on the basis of the position of the second work device 300. For example, the second drive control unit 350 of the second work device 300 outputs, to the control device 200, position information representing the position of the second work device 300 measured by the sensor 315. The use area selection unit 270 of the control device 200 may extract area information corresponding to the work area 640 where the distance from the position of the second work device 300 is smaller than a threshold value and output a list of the extracted area information.

In step S210, the use area selection unit 270 may output a list of area information representing degrees of appropriateness for determining the work route 750. For example, the use area selection unit 270 outputs a list of area information so that the area information is displayed in order of decreasing degree of appropriateness. The use area selection unit 270 may also calculate the degree of appropriateness for each area information and output a list with the calculated degree of appropriateness added to the area information.

For example, the use area selection unit 270 determines that an area information that has a shorter elapsed time since the registration date when the work area 640 was registered has a higher degree of appropriateness for determining the work route 750. The use area selection unit 270 may also determine that an area information that has a shorter elapsed time since the final use date last used to determine the work route 750 has a higher degree of appropriateness for determining the work route 750. The use area selection unit 270 may also determine that the smaller the value representing the distance from the vertex 630 to the route of the first work device 100 in the work area 640 represented in the area information, the higher the degree of appropriateness for determining the work route 750. The use area selection unit 270 may use a plurality of indicators, for example, two or more of the following: the elapsed time since the registration date, the elapsed time since the last use date, or the value representing the distance from the vertex 630 to the route of the first work device 100, to determine the degree of appropriateness. The use area selection unit 270 may also use the model of the work device used to register the work area 640 to determine the degree of appropriateness.

In step S210, which is moved from step S250, the use area selection unit 270 may limit the list of area information to be displayed on the input/output device 210 on the basis of the previously selected candidate area information. For example, the use area selection unit 270 may extract area information representing the work area 640 that matches the work area 640 represented by the previously selected candidate area information and output a list of the extracted area information. For example, the use area selection unit 270 extracts area information representing, among the work areas 640 represented in the previously selected candidate area information, the work areas 640 that contain an area whose percentage is greater than or equal to a threshold value.

The use area selection unit 270 may also extract area information in which the area of overlapping area between the work area 640 represented by the previously selected candidate area information and the work area 640 represented by the area information is greater than a predetermined ratio to the areas of the respective work areas 640. For example, the use area selection unit 270 selects one area information and calculates the area of overlapping area between the first work area represented by the previously selected candidate area information and the second work area represented by the selected area information. When the area of the overlapping area is greater than a predetermined ratio to the area of the first work area and greater than a predetermined ratio to the area of the second work area, the use area selection unit 270 extracts the selected area information.

The use area selection unit 270 may also extract area information representing the work area 640 that is similar to the shape of the work area 640 represented in the previously selected candidate area information. For example, on the basis of the quantity of the vertices 630 and the distance of the vertices 630 corresponding to each other, the use area selection unit 270 determines the similarity between the shape of the work area 640 represented in the previously selected candidate area information and the shape of the work area 640 represented in the area information. The use area selection unit 270 extracts area information whose determined similarity is greater than a threshold value.

In step S210, the use area selection unit 270 may accept registration of the work area by the second work device 300. For example, the operator inputs, to the input/output device 210, an operation representing that a work area is to be registered by the second work device 300. When the operation by the operator is input, the use area selection unit 270 ends the processing illustrated in FIG. 13 and starts the processing illustrated in FIG. 9.

The embodiment and the modified examples that have been described above are merely examples, and the configurations described in the embodiment and the modified examples may be arbitrarily changed and/or arbitrarily combined to an extent that does not interfere with the functions to be aimed. Furthermore, part of the functions that have been described in the embodiment and the modified examples may be omitted on condition that the necessary functions can be realized. For example, in step S150 illustrated in FIG. 9, the area determination unit 250 may determine the work area 640 without accepting a modification operation of the work area 640 by the user.

Figure 15:
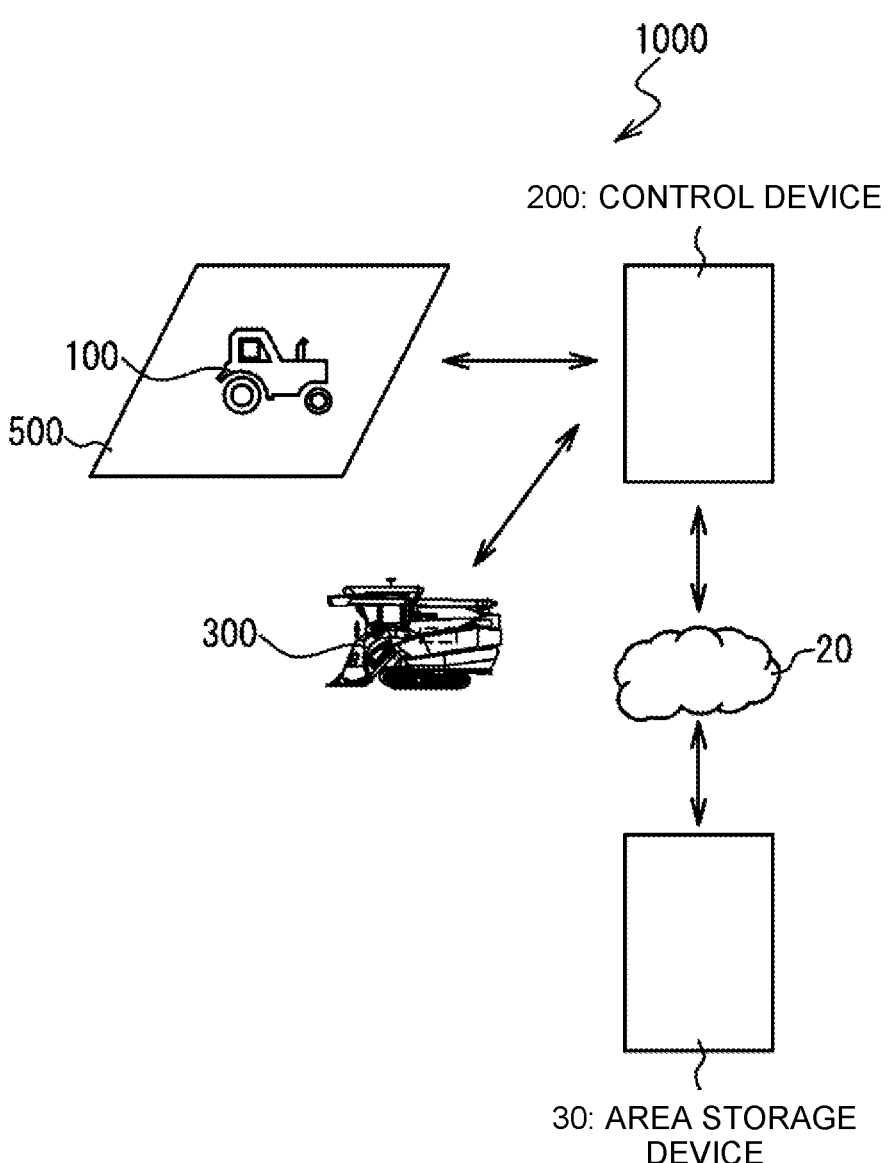
FIG. 15 is a schematic diagram of a work area management system in an embodiment.

For example, the first work device 100 or the second work device 300 may perform part of the processing of the control device 200. The work area management system 1000 may also include an area storage device 30 that is connected to the control device 200 via network 20, as illustrated in FIG. 15. In this case, the area storage device 30 performs part of the processing of the control device 200. For example, the area storage device 30 may realize the area storage unit 260 and the use area selection unit 270 illustrated in FIG. 5. In this case, the information to be displayed on the input/output device 210 of the control device 200 is output from the area storage device 30 to the control device 200 and displayed on the input/output device 210 of the control device 200. In addition, the work area management program 420 may include the first drive control program 400 and the second drive control program 430.

The work area management system 1000 may also include a plurality of the control devices 200 when including the area storage device 30. In this case, the control device 200 may determine a work route using the work area 640 registered by other control devices 200, because the area storage device 30 includes the work area data 410 that stores the work area 640.

The control device 200 may control a plurality of work devices, for example, all of the work devices that work in the field 500. The control device 200 may also control a work device that is not included in the work area management system 1000. In this case, the work area management system 1000 may not need to include work devices, for example, the first work device 100 and the second work device 300.

Figure 16:
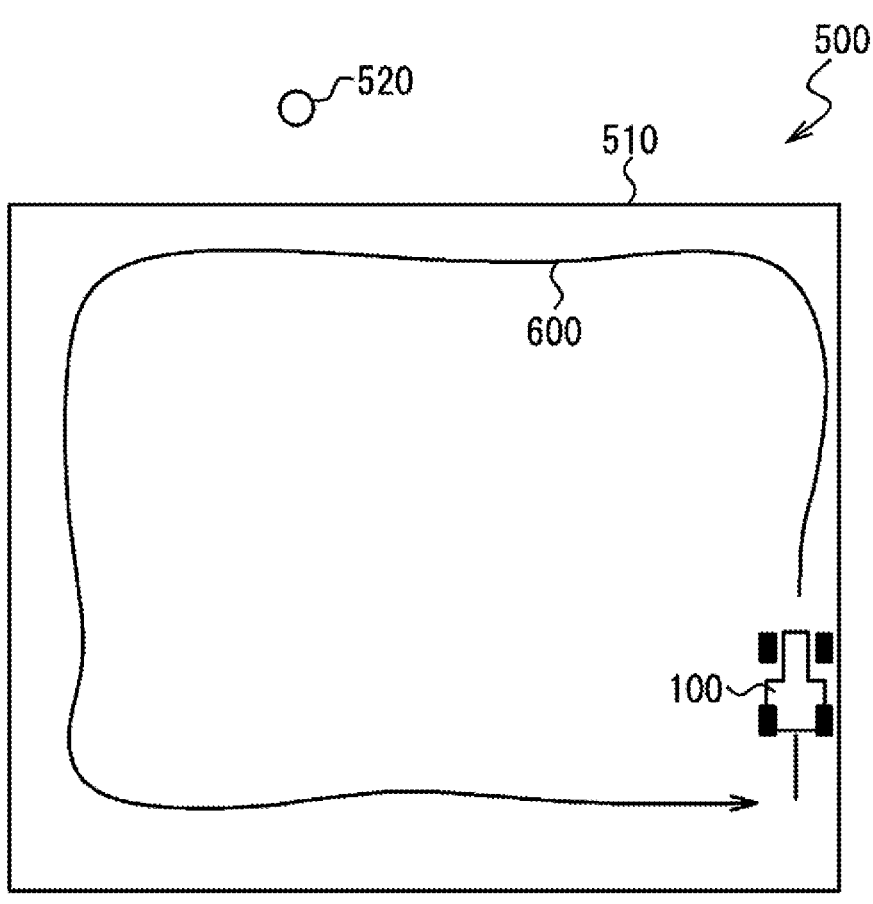
FIG. 16 is a diagram for explaining a fixed reference station used by the first work device when registering a work area in an embodiment.

As illustrated in FIG. 16, when the operator moves the first work device 100 along the contour of the work area 640 to register the work area 640, a real time kinematic (RTK) positioning method is used to accurately measure the position of the first work device 100, and a fixed reference station 520 may be installed temporarily. In the RTK positioning method, the fixed reference station 520 is installed at a position in the vicinity of the field with a pre-specified latitude and longitude. The fixed reference station 520 transmits a difference between the installed position (latitude and longitude) and the position (latitude and longitude) measured by the GNSS receiver at the fixed reference station 520 as correction information. The first work device 100 measures positions with high accuracy by correcting the positions measured by the positioning device using the correction information acquired from the fixed reference station 520. In this case, the control device 200 may store, in the work area data 410, reference station information that represents latitude and longitude indicating a position of the fixed reference station 520, for example, a specific position where the fixed reference station 520 is installed. For example, the area storage unit 260 of the control device 200 includes the reference station information in the area information and stores the reference station information in the work area data 410. The reference station information may be any information for identifying each fixed reference station 520, as long as the reference station information may represent the position of each fixed reference station 520. The specific position where the fixed reference station 520 is installed may represent an average value of the positions measured by the fixed reference station 520 for a plurality of times in a state where the fixed reference station 520 has been installed.

When the positions of the fixed reference station 520 are different, the work information registered in the work of the first work device 100 may not be used in the work of the second work device 300 due to errors in the positions measured in the second work device 300. Therefore, in step S210 illustrated in FIG. 13, when area information including reference station information is selected, the use area selection unit 270 of the control device 200 may determine whether the selected area information is suitable for determining the work route on the basis of the position where the fixed reference station 520 is installed. For example, the predetermined condition in step S220 may include that to position of the fixed reference station 520 installed for the second work device 300 to perform work is equal to the position of the fixed reference station 520 represented in the candidate area information.

In this case, the use area selection unit 270 acquires installation position information representing the installed position from the installed fixed reference station 520. The use area selection unit 270 determines that the selected area information is suitable for determining the work route when the position represented by the acquired installation position information is equal to the position of the reference station information included in the area information. For example, the use area selection unit 270 determines that two positions are equal when a distance from the position represented by the acquired installation position information to the position of the reference station information included in the area information is smaller than a threshold value. When the use area selection unit 270 determines that the two positions are different, in step S230, the use area selection unit 270 may output warning information to encourage the user to install the fixed reference station 520 in a correct position. For example, the use area selection unit 270 may output information representing the correct position of the fixed reference station 520.

Figure 17:
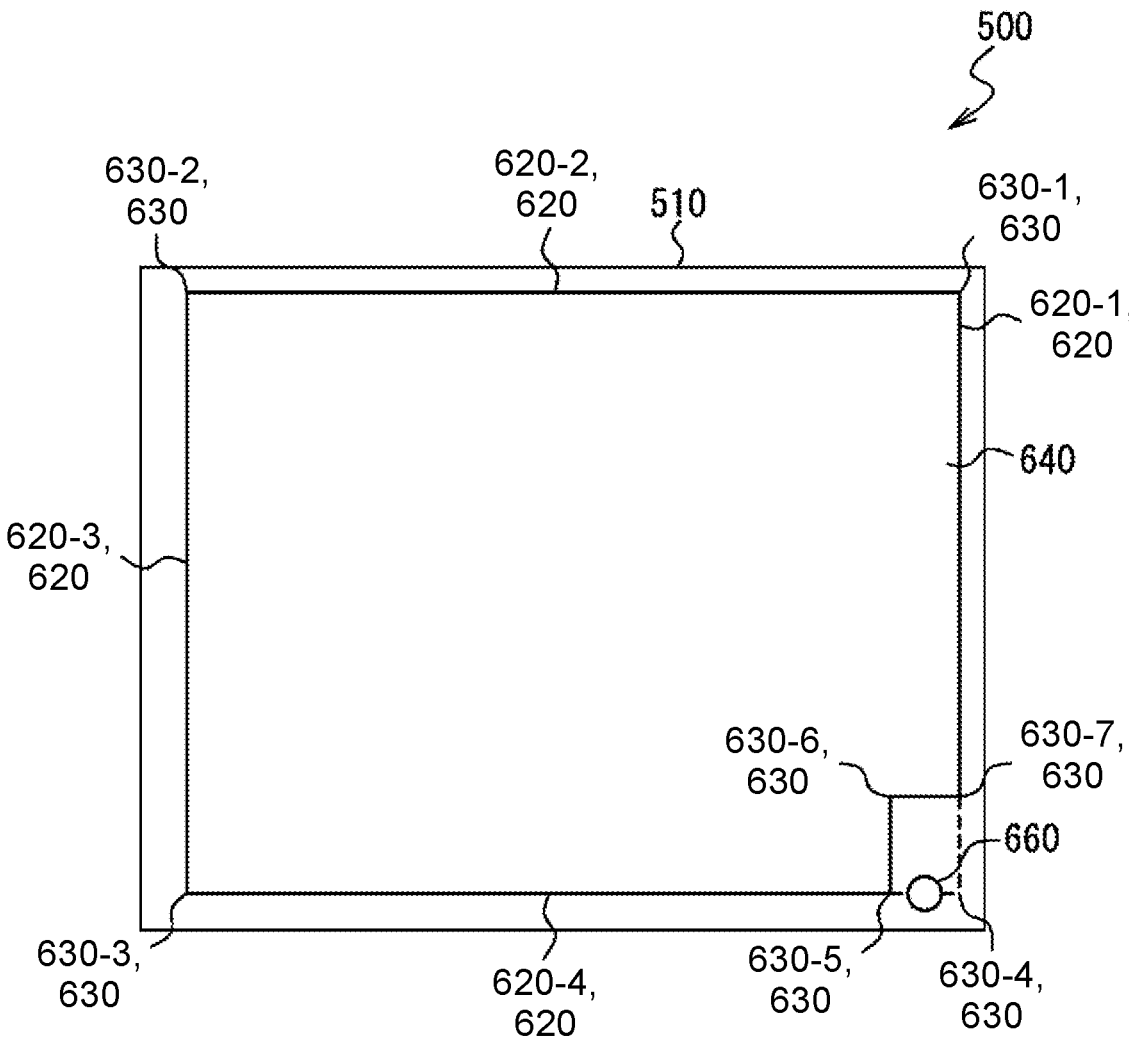
FIG. 17 is a diagram for explaining processing of registering a position of an entrance in an embodiment.

In step S150 illustrated in FIG. 9, the user may also register entrance information representing a position of the entrance of the field 500. For example, the area determination unit 250 displays an image representing the determined work area 640 on a map. The user inputs an operation to the input/output device 210 to specify the position of an entrance 660 in the displayed image, as illustrated in FIG. 17. The area determination unit 250 accepts entrance information representing the position of the specified entrance 660. In step S160, the accepted entrance information is included in the area information and stored in the work area data 410 by the area storage unit 260.

When area information including the entrance information is selected in step S210 illustrated in FIG. 13, the route determination unit 280 of the control device 200 may use the position represented by the entrance information as a starting or ending point of the work route 750. This facilitates the determination of the work route 750.

The work area data 410 may also store change information representing that the shape of the field 500 corresponding to the registered work area 640 has been changed. For example, the user inputs an operation to the input/output device 210 of the control device 200 to register that the shape of the field 500 corresponding to the work area 640 has been changed. When the operation by the user is input, the area storage unit 260 of the control device 200 accepts the change information representing the area information corresponding to the field 500 whose shape has been changed. For example, the area storage unit 260 displays, on the input/output device 210, a list of area information stored in the work area data 410. The user selects, from the list of area information displayed, the area information representing the work area 640 corresponding to the field 500 whose shape has been changed. The area storage unit 260 adds the change information representing that the shape of the corresponding field 500 has been changed to the selected area information and stores the information in the work area data 410. In this case, in step S210 illustrated in FIG. 13, when a list of area information is displayed, the use area selection unit 270 excludes the area information representing the work area 640 corresponding to the field 500 whose shape has been changed. The area storage unit 260 may also accept change information from other systems representing that the shape of the field 500 has been changed.

Figure 18:
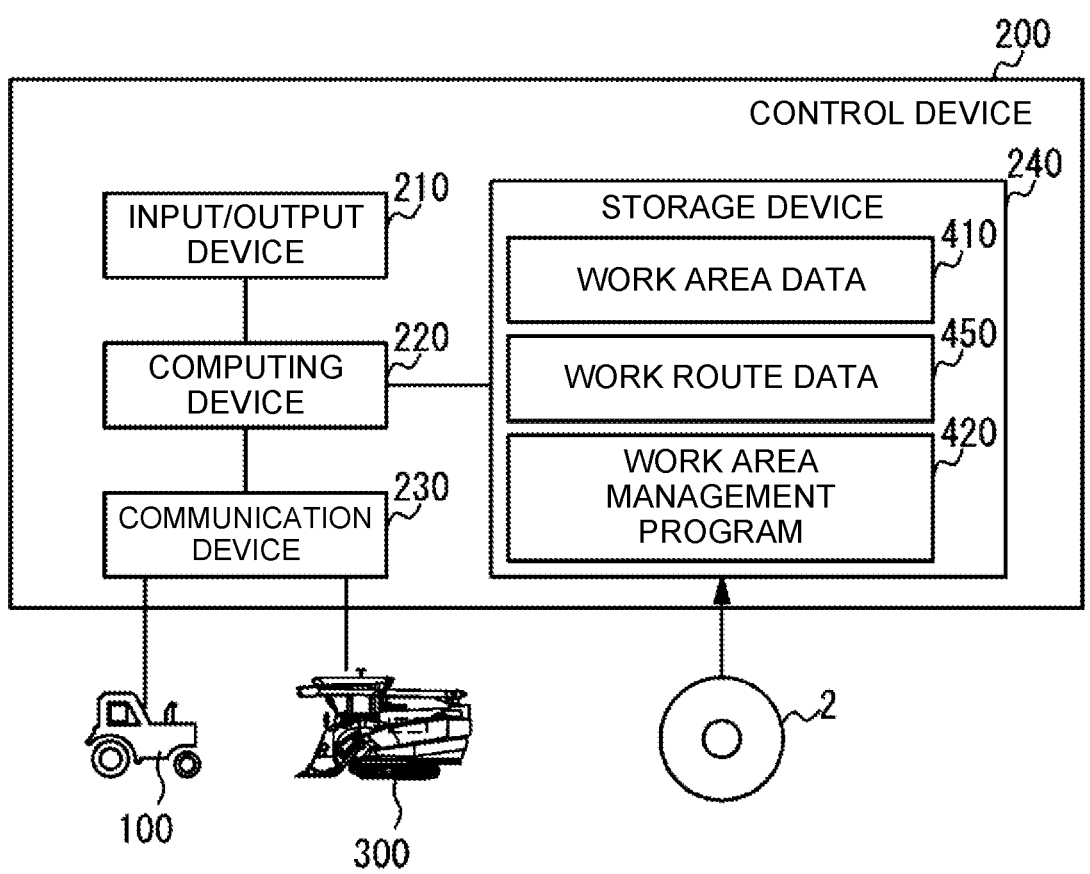
FIG. 18 is a diagram illustrating a configuration of a control device in an embodiment.

In step S170 illustrated in FIG. 9 and step S260 illustrated in FIG. 13, the route determination unit 280 may store one or more pieces of route information representing one or more determined work routes 650 and 750. For example, the route determination unit 280 may store the route information in work route data 450 included in the storage device 140, as illustrated in FIG. 18. The stored route information representing the work route 650 may be used later when the first work device 100 performs work in the field 500. For example, the operator may move the first work device 100 along the work route 650 of the route information stored in the route determination unit 280 and used for past work to perform new work in the field 500.

In this case, the operator selects route information to be used for the work of the first work device 100 from the list of route information displayed on the input/output device 210 of the control device 200. The route determination unit 280 outputs the selected route information to the first work device 100. The first drive control unit 150 of the first work device 100 moves the first work device 100 along the work route 650 represented by the selected route information. Similarly, the stored route information representing the work route 750 may be used later when the second work device 300 performs work in the field 500.

The route information may be stored in association with the work area 640 used when the work routes 650 and 750 represented in the route information were determined. In this case, the route information is grouped according to the work area 640 used when the work routes 650 and 750 represented in the route information were determined. For example, when the shape of the field 500 corresponding to the work area 640 has been changed, the route determination unit 280 of the control device 200 may warn the operator when any route information represented in association with the work area 640 corresponding to the changed field 500 is used.

In this case, the area storage unit 260 accepts change information representing that the shape of the field 500 corresponding to the work area 640 has been changed. On the basis of the accepted change information, the area storage unit 260 adds the change information to the corresponding area information among the area information stored in the work area data 410. When the operator uses any route information represented in association with the work area 640 corresponding to the field 500 whose shape has been changed, the route determination unit 280 outputs, to the input/output device 210, warning information representing that the route information being used is not appropriate thereby warning the operator. For example, the route determination unit 280 displays a list of route information stored in the work route data 450 on the input/output device 210. The operator selects route information to be used for the work by the second work device 300 from the displayed list of route information. On the basis of the work area 640 represented by the selected route information, the route determination unit 280 acquires area information representing the work area 640 from the work area data 410. When the acquired area information includes change information representing that the shape of the corresponding field 500 has been changed, the route determination unit 280 outputs warning information to the input/output device 210. The warning information represents, for example, that the shape of the field 500 used in determining the work routes 650 and 750 represented in the selected route information has been changed.

In step S180 illustrated in FIG. 9, the first work device 100 may output operation information acquired from the sensor 115 to the control device 200 when performing work in the field. In step S270 illustrated in FIG. 13, the second work device 300 may output operation information acquired from the sensor 315 to the control device 200 when performing work in the field. In these cases, the area determination unit 250 of the control device 200 may store the acquired operation information in the storage device 140 in association with the route information representing the work route 650 of the first work device 100 or the work route 750 of the second work device 300. For example, when the route information is associated with the work area 640, the operation information may be stored in association with the work area 640 with which the corresponding route information is associated. The area determination unit 250 may store the operation information in the storage device 140 in association with area information representing the work area 640 used to determine the work route 650 of the first work device 100 or the work route 750 of the second work device 300. As a result, the operation information is grouped according to area information. This enables operation information related to work performed in the same work area 640 to be grouped together and stored in the storage device 140. By grouping the operation information related to work performed in the same work area 640, information related to work performed in the same field 500 is grouped together. This enables the operator to efficiently perform farm management.

(Appendices)

The work area management method, work area management system, and work area management program described in each embodiment can be described as follows.

A work area management method according to a first aspect includes storing first area information that represents a first work area for determining a first work route along which a first work device moves to perform a first work in a field, and that is determined on the basis of a positioning position of the first work device, and outputting the first area information as information that represents an area for determining a second work route along which a second work device different from the first work device moves to perform a second work in the field.

A work area management method according to a second aspect is the work area management method according to the first aspect, in which the outputting the first area information includes outputting warning information representing that the first area information is unsuitable for determining the second work route when the first area information does not satisfy a predetermined condition.

A work area management method according to a third aspect is the work area management method according to the second aspect, in which the first work area is formed by a polygon, and the outputting the warning information includes outputting the warning information on the basis of a distance from a vertex of the first work area to a registration route represented by the positioning position of the first work area.

A work area management method according to a fourth aspect is the work area management method according to the second or third aspect, in which the predetermined condition includes that a predetermined time or longer has not elapsed since the first area information was registered.

A work area management method according to a fifth aspect is the work area management method according to any one of the second to fourth aspects, in which the predetermined condition includes that a predetermined time or longer has not elapsed since the first area information was used to determine a work route.

A work area management method according to a sixth aspect is the work area management method according to any one of the second to fifth aspects, in which the predetermined condition includes that a model of the first work device is not included in a first unsuitable model group that represents models of work devices that are unsuitable in determining a work route of a work device.

A work area management method according to a seventh aspect is the work area management method according to any one of the second to sixth aspects, in which the predetermined condition includes that a model of the first work device is not included in a second unsuitable model group that represents models of work devices that are unsuitable in determining the second work route of the second work device.

A work area management method according to an eighth aspect is the work area management method according to any one of the first to seventh aspects, in which the first area information includes reference station information that represents a position of a fixed reference station installed when the first work area is determined by the first work device to improve accuracy in measuring a position of the first work device, and the predetermined condition includes that a position of the fixed reference station installed for the second work device to perform the second work is equal to the position of the fixed reference station represented in the reference station information.

A work area management method according to a ninth aspect is the work area management method according to any one of the first to eighth aspects, in which the storing the first area information includes storing a plurality of pieces of area information including the first area information, and the outputting the first area information includes outputting a list of the plurality of pieces of area information each representing a degree of appropriateness in determining the second work route of the second work device, and accepting area information selected by an operator from the outputted list of the plurality of pieces of area information as the first area information.

A work area management method according to a tenth aspect is the work area management method according to any one of the first to ninth aspects, in which the second work is different from the first work.

A work area management method according to an 11th aspect is the work area management method according to any one of the first to tenth aspects, which includes determining the first work route along which the first work device moves to perform the first work in the first work area, and determining the second work route along which the second work device moves to perform the second work in the first work area.

A work area management method according to a 12th aspect is the work area management method according to any one of the first to 11th aspects, in which the first area information includes entrance information representing a position of an entrance of the field.

A work area management method according to a 13th aspect is the work area management method according to any one of the first to 12th aspects, which includes storing one or more pieces of route information that represent one or more work routes determined on the basis of the first work area in association with the first work area.

A work area management method according to a 14th aspect is the work area management method according to the 13th aspect, which includes accepting change information representing that a shape of the field corresponding to the first work area has been changed, and outputting, according to the change information, warning information representing that the shape of the field used in determining the work route represented in the first route information has been changed when any first route information included in the one or more pieces of route information represented in association with the first work area is used.

A work area management method according to a 15th aspect is the work area management method according to any one of the first to 14th aspects, which includes storing first operation information representing a state when the first work device moved along the first work route in association with the first area information, and storing second operation information representing a state when the second work device moved along the second work route in association with the first area information.

A work area management system according to a 16th aspect has an area storage unit that stores first area information representing a first work area for determining a first work route along which a first work device moves to perform a first work in a field and that is determined on the basis of a positioning position of the first work device, and a use area selection unit that outputs the first area information as information representing an area in the field that The area selection unit outputs the first area information as information representing an area for determining a second work route along which a second work device different from the first work device moves to perform the second work in the field.

A work area management program according to a 17th aspect causes a computing device to execute storing first area information that represents a first work area for determining a first work route along which a first work device moves to perform a first work in a field, and that is determined on the basis of a positioning position of the first work device, and outputting the first area information as information that represents an area for determining a second work route along which a second work device different from the first work device moves to perform a second work in the field.

REFERENCE SIGNS LIST 1, 2, 3: Storage medium
20: Network
30: Area storage device
100: First work device
110: Key switch
115: Sensor
120: Computing device
130: Communication device
140: Storage device
150: First drive control unit
200: Control device
210: Input/output device
220: Computing device
230: Communication device
240: Storage device
250: Area determination unit
260: Area storage unit
270: Use area selection unit
280: Route determination unit
300: Second work device
310: Key switch
315: Sensor
320: Computing device
330: communication device
340: Storage device
350: Second drive control unit
400: First drive control program
410: Work area data
420: Work area management program
430: Second drive control program
450: Work route data

500: Field
510: Contour
520: Fixed reference station
600: Registration route
610: Outer edge route
620: Approximate straight line
630: Vertex
640: Work area (first work area)
650: Work route (first work route)
660: Entrance
700: Registration route
750: Work route (second work route)
1000: Work area management system

The invention claimed is:

1. A work area management method, comprising:
storing first area information that represents a first work area for determining a first work route along which a first work device moves to perform a first work in a field, and that is determined on the basis of a positioning position of the first work device;
outputting the first area information as information that represents an area for determining a second work route along which a second work device different from the first work device moves to perform a second work in the field; and
registering whether the first area information for determining a second work route satisfies a predetermined condition, wherein
the predetermined condition includes that a model of the first work device is not included in a first or second unsuitable model group, which represents models of work devices that are unsuitable in determining the first or second work route of the first or second work device, respectively.

2. The work area management method according to claim 1, wherein
the outputting the first area information includes outputting warning information representing that the first area information is unsuitable for determining the second work route when the first area information does not satisfy the predetermined condition.

3. The work area management method according to claim 2, wherein
the first work area is formed by a polygon, and
the outputting the warning information includes outputting the warning information on the basis of a distance from a vertex of the first work area to a registration route represented by the positioning position of the first work area.

4. The work area management method according to claim 2, wherein
the predetermined condition includes that a predetermined time or longer has not elapsed since the first area information was registered.

5. The work area management method according to claim 2, wherein
the predetermined condition includes that a predetermined time or longer has not elapsed since the first area information was used to determine a work route.

6. The work area management method according to claim 2, wherein
the first area information includes reference station information that represents a position of a fixed reference station installed when the first work area is determined by the first work device to improve accuracy in measuring a position of the first work device, and the predetermined condition includes that a position of the fixed reference station installed for the second work device to perform the second work is equal to the position of the fixed reference station represented in the reference station information.

7. The work area management method according to claim 1, wherein
the storing the first area information includes storing a plurality of pieces of area information including the first area information, and
the outputting the first area information includes:
outputting a list of the plurality of pieces of area information each representing a degree of appropriateness in determining the second work route of the second work device; and
accepting area information selected by an operator from the outputted list of the plurality of pieces of area information as the first area information.

8. The work area management method according to claim 1, wherein
the second work is different from the first work.

9. The work area management method according to claim 1, further comprising:
determining the first work route along which the first work device moves to perform the first work in the first work area; and
determining the second work route along which the second work device moves to perform the second work in the first work area.

10. The work area management method according to claim 1, wherein
the first area information includes entrance information representing a position of an entrance of the field.

11. The work area management method according to claim 1, further comprising:
storing one or more pieces of route information that represent one or more work routes determined on the basis of the first work area, in association with the first work area.

12. The work area management method according to claim 11, further comprising:
accepting change information representing that a shape of the field corresponding to the first work area has been changed; and
when any first route information included in the one or more pieces of route information represented in association with the first work area is used, outputting warning information representing that the shape of the field used in determining the work route represented in the first route information has been changed, according to the change information.

13. The work area management method according to claim 1, further comprising:
storing first operation information representing a state when the first work device moved along the first work route, in association with the first area information; and
storing second operation information representing a state when the second work device moved along the second work route, in association with the first area information.

14. A work area management system, comprising:
an area storage unit that stores first area information which represents a first work area for determining a first work route along which a first work device moves to perform a first work in a field, and which is determined on the basis of a positioning position of the first work device; and a use area selection unit that outputs the first area information as information that represents an area for determining a second work route along which a second work device different from the first work device moves to perform a second work in the field; and the use area selection unit registers whether the first area information for determining a work route satisfies a predetermined condition, wherein the predetermined condition includes that a model of the first work device is not included in a first or second unsuitable model group, which represents models of work devices that are unsuitable in determining the first or second work route of the first or second work device, respectively.

15. A non-transitory computer-readable medium comprising a work area management program that causes a computing device to execute:

storing first area information that represents a first work area for determining a first work route along which a first work device moves to perform a first work in a field, and that is determined on the basis of a positioning position of the first work device; and outputting the first area information as information that represents an area for determining a second work route along which a second work device different from the first work device moves to perform a second work in the field; and registering whether the first area information for determining a second work route satisfies a predetermined condition, wherein the predetermined condition includes that a model of the first work device is not included in a first or second unsuitable model group, which represents models of work devices that are unsuitable in determining the first or second work route of the first or second work device, respectively.

\* \* \* \* \*